United States Patent
Su et al.

(10) Patent No.: US 11,250,628 B2
(45) Date of Patent: Feb. 15, 2022

(54) METHOD AND SYSTEM FOR GEOMETRICAL RECONSTRUCTION OF AN INTERNAL ANATOMICAL STRUCTURE

(71) Applicants: Agency for Science, Technology and Research, Singapore (SG); Singapore Health Services Pte Ltd, Singapore (SG)

(72) Inventors: Yi Su, Singapore (SG); Soo Kng Teo, Singapore (SG); Xiaodan Zhao, Singapore (SG); Liang Zhong, Singapore (SG); Ru San Tan, Singapore (SG)

(73) Assignees: Agency for Science, Technology and Research, Singapore (SG); Singapore Health Services Pte Ltd, Singapore (SG)

( * ) Notice: Subject to any disclaimer, the term of this patent is extended or adjusted under 35 U.S.C. 154(b) by 31 days.

(21) Appl. No.: 16/649,955

(22) PCT Filed: Oct. 5, 2018

(86) PCT No.: PCT/SG2018/050506
§ 371 (c)(1),
(2) Date: Mar. 23, 2020

(87) PCT Pub. No.: WO2019/070202
PCT Pub. Date: Apr. 11, 2019

(65) Prior Publication Data
US 2020/0226831 A1    Jul. 16, 2020

(30) Foreign Application Priority Data
Oct. 5, 2017 (SG) .......................... 10201708208Q

(51) Int. Cl.
G06T 7/00 (2017.01)
G06T 17/20 (2006.01)
G06T 7/246 (2017.01)

(52) U.S. Cl.
CPC .......... G06T 17/205 (2013.01); G06T 7/0012 (2013.01); G06T 7/251 (2017.01); G06T 2207/30048 (2013.01); G06T 2210/41 (2013.01)

(58) Field of Classification Search
CPC ..... G06T 17/205; G06T 7/251; G06T 7/0012; G06T 2207/30048; G06T 2210/41; G06T 2219/2021; G06T 19/20; G06T 17/20
See application file for complete search history.

(56) References Cited

U.S. PATENT DOCUMENTS 8,781,552 B2   7/2014   Lu et al.
9,275,190 B2   3/2016   Zheng et al.
(Continued)

FOREIGN PATENT DOCUMENTS

WO    2015130231 A1    9/2015

OTHER PUBLICATIONS

International Search Report for International Application No. PCT/SG2018/050506 dated Dec. 27, 2018, pp. 1-4.
(Continued)

Primary Examiner — Siamak Harandi
(74) Attorney, Agent, or Firm — Winstead PC

(57) ABSTRACT

There is provided a method for geometrical reconstruction of an internal anatomical structure using at least one processor based on a set of contours derived from the internal anatomical structure, the set of contours including a first subset of long-axis contours obtained based on a first set of long-axis images of the internal anatomical structure. The method includes: adjusting the set of contours, comprising
(Continued)

adjusting the first subset of long-axis contours to correct for motion artefacts in the first set of long-axis images; and deforming a template three-dimensional (3D) surface mesh preconfigured for the internal anatomical structure's type into a deformed 3D surface mesh based on the adjusted set of contours to obtain the geometrical reconstruction of the internal anatomical structure. In particular, the internal anatomical structure is a heart. There is also provided a corresponding system for geometrical reconstruction of an internal anatomical structure.

18 Claims, 17 Drawing Sheets

(56) References Cited

U.S. PATENT DOCUMENTS

| 9,508,140 | B2 | 11/2016 | Su et al. |
|---|---|---|---|
| 2012/0101368 | A1* | 4/2012 | Masumoto ............. G06T 19/20 600/420 |
| 2014/0212015 | A1 | 7/2014 | Ding et al. |

OTHER PUBLICATIONS

Written Opinion of the International Searching Authority for International Application No. PCT/SG2018/050506 dated Dec. 27, 2018, pp. 1-5.
Welch et al., "Free-Form Shape Design Using Triangulated Surfaces," Proceedings of the 21st Annual Conference on Computer Graphics and Interactive Techniques, Jul. 1994, pp. 247-256.
Su et al., "Mesh Processing Using Virtual Geometry," WSEAS Transactions on Computers, vol. 5, No. 4, 2006, pp. 697-704.
Su et al., "Templatized Refinement of Triangle Meshes Using Surface Interpolation," International Journal for Numerical Methods in Engineering, vol. 65, 2006, pp. 1472-1494.
Su et al., "Generalized Surface Interpolation for Triangle Meshes with Feature Retention," Computer-Aided Design & Applications, vol. 2, Nos. 1-4, 2005, pp. 193-202.
Teo et al., "Regional Ejection Fraction and Regional Area Strain for Left Ventricular Function Assessment in Male Patients after First-Time Myocardial Infarction," Journal of the Royal Society Interface, vol. 12, No. 105, 2015, pp. 1-13.
Takagi et al., "Comparison of Determinations of Left Atrial Volume by the Biplane Area-Length and Simpson's Methods Using 64-Slice Computed Tomography," Journal of Cardiology, vol. 53, 2009, pp. 257-264.
Vardoulis et al., "Single Breath-Hold 3D Measurement of Left Atrial vol. Using Compressed Sensing Cardiovascular Magnetic Resonance and a Non-Model-Based Reconstruction Approach," Journal of Cardiovascular Magnetic Resonance, vol. 17, No. 47, 2015, pp. 1-14.
Tobon-Gomez et al., "Benchmark for Algorithms Segmenting the Left Atrium from 3D CT and MRI Datasets," IEEE Transactions on Medical Imaging, vol. 34, No. 7, 2015, pp. 1460-1473.
Nacif et al., "Left Atrial Volume Quantification Using Cardiac MRI in Atrial Fibrillation: Comparison of the Simpson's Method with Biplane Area-Length, Ellipse, and Three-Dimensional Methods," Diagnostic and Interventional Radiology, vol. 19, No. 3, 2013, pp. 213-220.
Wan et al., "Correcting Motion in Multiplanar Cardiac Magnetic Resonance Images," BioMedical Engineering, vol. 15, No. 93, 2016, pp. 1-16.
Lim et al., "Automatic 4D Reconstruction of Patient-Specific Cardiac Mesh with 1-to-1 Vertex Correspondence from Segmented Contours Lines," PloS One, vol. 9, No. 4, Apr. 2014, e93747, pp. 1-14.
Extended European Search Report for European Patent Application No. 18 864 682.2 dated May 31, 2021, pp. 1-8.
Kang et al., "3D Motion Modeling and Reconstruction of Left Ventricle Wall in Cardiac MRI," Lecture Notes in Computer Science, vol. 10263, 2017, pp. 481-492.

\* cited by examiner

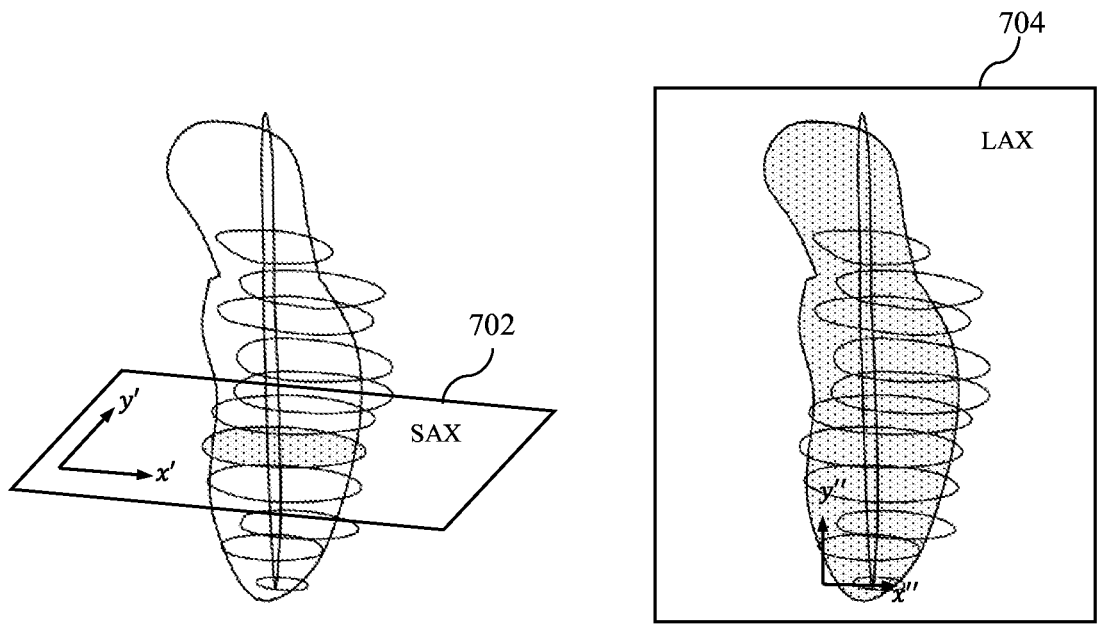
FIG. 7A   FIG. 7B
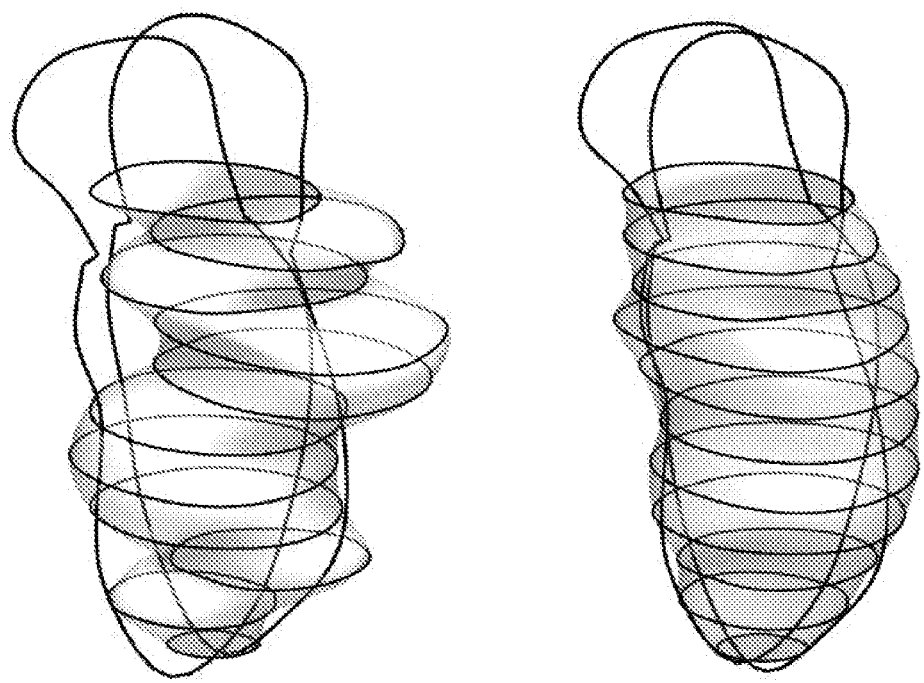
FIG. 8A   FIG. 8B

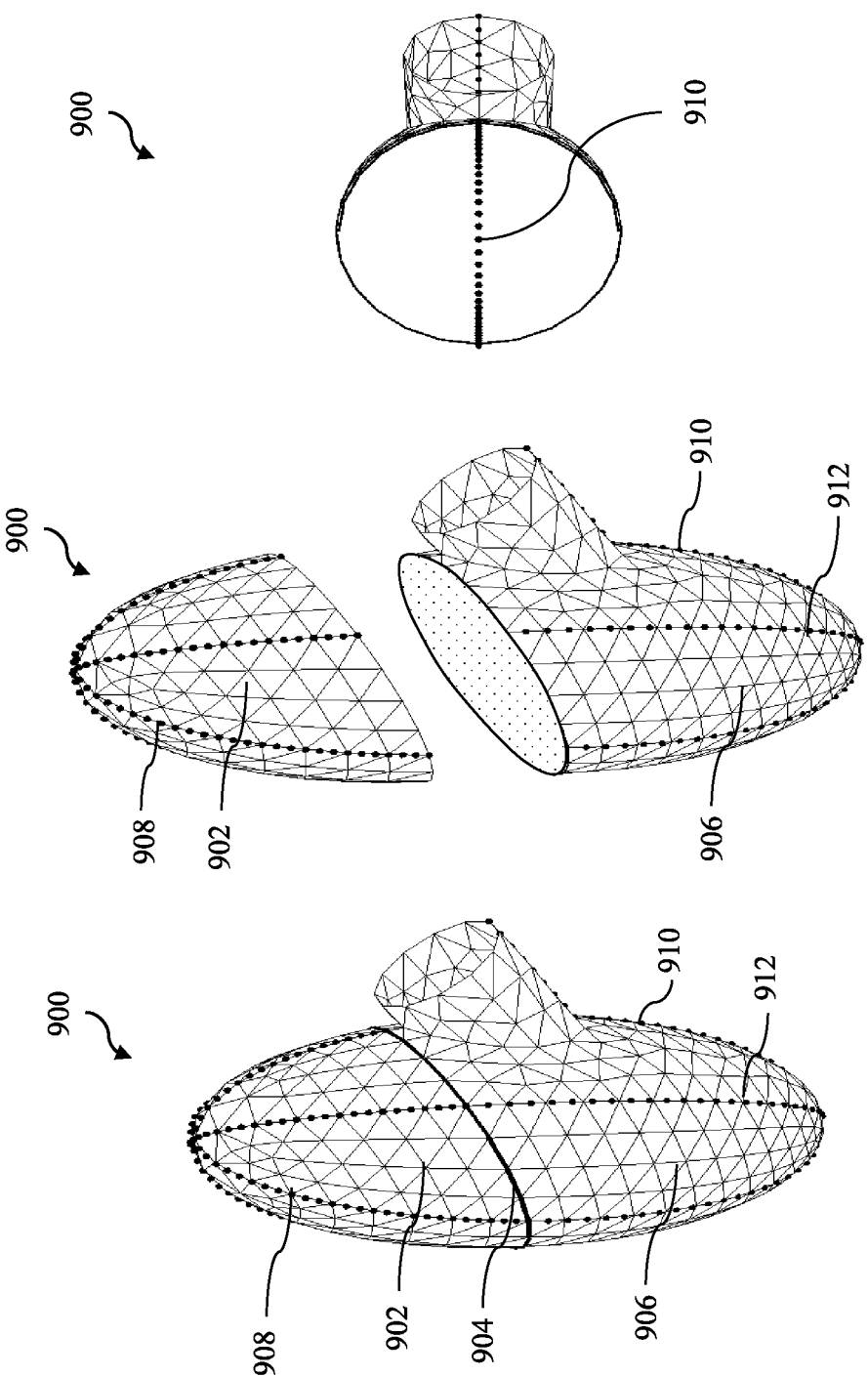

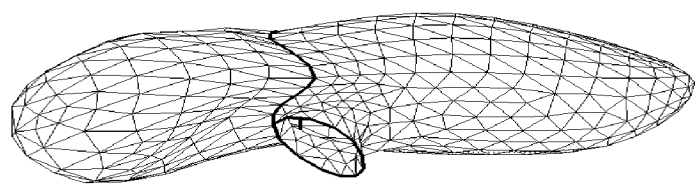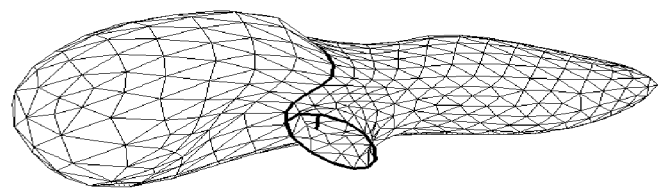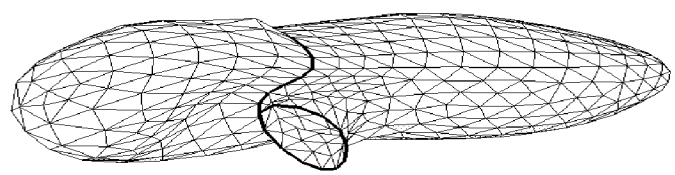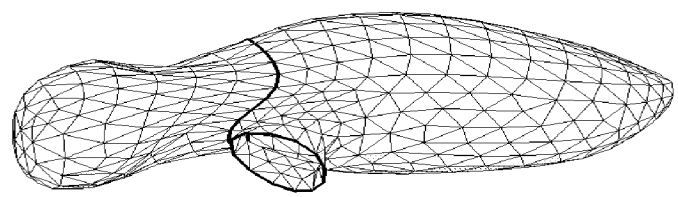
FIG. 11

METHOD AND SYSTEM FOR GEOMETRICAL RECONSTRUCTION OF AN INTERNAL ANATOMICAL STRUCTURE

CROSS-REFERENCE TO RELATED APPLICATION

This application claims the benefit of priority of Singapore Patent Application No. 10201708208Q, filed 5 Oct. 2017, the content of which being hereby incorporated by reference in its entirety for all purposes.

TECHNICAL FIELD

The present invention generally relates to a method and a system for geometrical reconstruction of an internal anatomical structure, and more particularly, three-dimensional (3D) geometrical reconstruction.

BACKGROUND

A geometrical reconstruction of an internal anatomical structure (e.g., an organ of the human or animal body) may be obtained to facilitate various analysis or examination of the internal anatomical structure. For example and without limitation, in the case of the internal anatomical structure being a heart, left atrial (LA) dilatation has been associated with a large variety of cardiac diseases, which results from either the chronic volume and/or pressure overload of the LA. Studies have shown that LA dilation has been associated with the severity of left ventricular (LV) diastolic dysfunction and it is also a recognized adverse prognostic marker in several cardiac diseases, such as heart failure, hypertension, myocardial infarction, hypertrophic cardiomyopathy, or mitral valve disease.

The American Society of Echocardiography (ASE) has recommended the quantification of LA volumes by two-dimensional (2D) echocardiography using either the biplane area-length method or the method of discs (i.e., Simpson's method). However, 2D and 3D echo usually underestimate LA size and volume as compared to cardiovascular magnetic resonance (CMR) and multi-slice computed tomography (MSCT). The higher spatial resolution and non-invasiveness afforded by CMR has made it a preferred method for the assessment of cardiac anatomy, dimensions, function and mass. However, the standard short-axis method of measuring LA volume and ejection fraction is very time-consuming, both in terms of acquisition of additional slices as well as additional analysis time. Hence, there has been an increasing number of studies performed to verify the accuracy and reproducibility of computing LA volumes using either the biplane area-length method or the Simpson's method on long-axis CMR images.

However, a limitation of using either the biplane area-length method or the Simpson's method is that the LA volume computed is based on 2D images and not the actual 3D geometry of the LA. It has conventionally been challenging to obtain realistic 3D LA geometry based on CMR images because of the lower spatial resolution and intensity inhomogeneities that pose difficulties for automated segmentation algorithms.

A need therefore exists to provide a method and a system for geometrical reconstruction of an internal anatomical structure that seek to overcome, or at least ameliorate, one or more of the deficiencies associated with conventional methods and systems. It is against this background that the present invention has been developed.

SUMMARY

According to a first aspect of the present invention, there is provided a method for geometrical reconstruction of an internal anatomical structure using at least one processor based on a set of contours derived from the internal anatomical structure, the set of contours comprising a first subset of long-axis contours obtained based on a first set of long-axis images of the internal anatomical structure, the method comprising:

adjusting the set of contours, comprising adjusting the first subset of long-axis contours to correct for motion artefacts in the first set of long-axis images; and deforming a template three-dimensional (3D) surface mesh preconfigured for the internal anatomical structure's type into a deformed 3D surface mesh based on the adjusted set of contours to obtain the geometrical reconstruction of the internal anatomical structure.

In various embodiments, said adjusting the set of contours further comprises:

determining, for each pair of long-axis contours in the first subset of long-axis contours, a first measure associated with the pair of long-axis contours based on a degree of superimposition between the pair of long-axis contours, wherein said adjusting the first subset of long-axis contours is based on a first function that is dependent on the first measure respectively determined for said each pair of long-axis contours.

In various embodiments, the set of contours further comprises a second subset of short-axis contours obtained based on a second set of short-axis images of the internal anatomical structure, and said adjusting the set of contours further comprises adjusting the second subset of short-axis contours to correct for motion artefacts in the second set of short-axis images.

In various embodiments, said adjusting the set of contours further comprises:

determining, for each pair of long-axis contour in the first subset of long-axis contours and short-axis contour in the second subset of short-axis contours, a second measure associated with the pair of long-axis contour and short-axis contour based on a degree of superimposition between the pair of long-axis contour and short-axis contour;

wherein said adjusting the first subset of long-axis contours and said adjusting the second subset of short-axis contours are based on the first function that is further dependent on the second measure respectively determined for said each pair of long-axis contour and short-axis contour.

In various embodiments, said adjusting the first subset of long-axis contours comprises translating one or more of the long-axis contours in the first subset of long-axis contours and said adjusting the second subset of short-axis contours comprises translating one or more of the short-axis contours in the second subset of short-axis contours, based on a minimization of the first function.

In various embodiments:

the first set of long-axis images and the second set of short-axis images of the internal anatomical structure are obtained over one or more cycles associated with the internal anatomical structure, each cycle comprising a plurality of phases, said determining the first measure and said determining the second measure are performed for each of the plurality of phases, and the minimization of the first function is performed over the cycle associated with the internal anatomical structure.

In various embodiments, said deforming the template 3D surface mesh comprises mapping, for each of a plurality of long-axis contours of the adjusted set of contours, source control points on the template 3D surface mesh with respect to corresponding target control points on the long-axis contours, respectively.

In various embodiments, said deforming the template 3D surface mesh further comprises determining a weight parameter for each of the plurality of long-axis contours, respectively; and said mapping is performed based on a mapping function that is dependent on the weight parameter respectively determined for said each of the plurality of long-axis contours.

In various embodiments, the weight parameter is determined based on a distance between the long-axis contour of the plurality of long-axis contours and a corresponding long-axis contour of the template 3D surface mesh.

In various embodiments, said deforming the template 3D surface mesh comprises deforming the template 3D surface mesh iteratively, wherein for each iteration, said mapping is performed based on the mapping function that is dependent on the weight parameter respectively determined for said each of the plurality of long-axis contours, the weight parameter being determined based on said corresponding long-axis contour of the template 3D surface mesh deformed at the immediately preceding iteration.

According to a second aspect of the present invention, there is provided a system for geometrical reconstruction of an internal anatomical structure based on a set of contours derived from the internal anatomical structure, the set of contours comprising a first subset of long-axis contours obtained based on a first set of long-axis images of the internal anatomical structure, the system comprising:

a memory; and at least one processor communicatively coupled to the memory and configured to:

adjust the set of contours, comprising adjusting the first subset of long-axis contours to correct for motion artefacts in the first set of long-axis images; and deform a template three-dimensional (3D) surface mesh preconfigured for the internal anatomical structure's type into a deformed 3D surface mesh based on the adjusted set of contours to obtain the geometrical reconstruction of the internal anatomical structure.

In various embodiments, said adjust the set of contours further comprises:

determining, for each pair of long-axis contours in the first subset of long-axis contours, a first measure associated with the pair of long-axis contours based on a degree of superimposition between the pair of long-axis contours, wherein said adjusting the first subset of long-axis contours is based on a first function that is dependent on the first measure respectively determined for said each pair of long-axis contours.

In various embodiments, the set of contours further comprises a second subset of short-axis contours obtained based on a second set of short-axis images of the internal anatomical structure, and said adjust the set of contours further comprises adjusting the second subset of short-axis contours to correct for motion artefacts in the second set of short-axis images.

In various embodiments, said adjust the set of contours further comprises:

determining, for each pair of long-axis contour in the first subset of long-axis contours and short-axis contour in the second subset of short-axis contours, a second measure associated with the pair of long-axis contour and short-axis contour based on a degree of superimposition between the pair of long-axis contour and short-axis contour;

wherein said adjusting the first subset of long-axis contours and said adjusting the second subset of short-axis contours are based on the first function that is further dependent on the second measure respectively determined for said each pair of long-axis contour and short-axis contour.

In various embodiments, said adjusting the first subset of long-axis contours comprises translating one or more of the long-axis contours in the first subset of long-axis contours and said adjusting the second subset of short-axis contours comprises translating one or more of the short-axis contours in the second subset of short-axis contours, based on a minimization of the first function.

In various embodiments:

the first set of long-axis images and the second set of short-axis images of the internal anatomical structure are obtained over one or more cycles associated with the internal anatomical structure, each cycle comprising a plurality of phases, said determining the first measure and said determining the second measure are performed for each of the plurality of phases, and the minimization of the first function is performed over the cycle associated with the internal anatomical structure.

In various embodiments, said deform the template 3D surface mesh comprises: mapping, for each of a plurality of long-axis contours of the adjusted set of contours, source control points on the template 3D surface mesh with respect to corresponding target control points on the long-axis contours, respectively.

In various embodiments, said deforming the template 3D surface mesh further comprises determining a weight parameter for each of the plurality of long-axis contours, respectively; and said mapping is performed based on a mapping function that is dependent on the weight parameter respectively determined for said each of the plurality of long-axis contours.

In various embodiments:

the weight parameter is determined based on a distance between the long-axis contour of the plurality of long-axis contours and a corresponding long-axis contour of the template 3D surface mesh, and said deform the template 3D surface mesh comprises deforming the template 3D surface mesh iteratively, wherein for each iteration, said mapping is performed based on the mapping function that is dependent on the weight parameter respectively determined for said each of the plurality of long-axis contours, the weight parameter being determined based on said corresponding long-axis contour of the template 3D surface mesh deformed at the immediately preceding iteration.

According to a third aspect of the present invention, there is provided a computer program product, embodied in one or more non-transitory computer-readable storage mediums, comprising instructions executable by at least one processor to perform a method for geometrical reconstruction of an internal anatomical structure based on a set of contours derived from the internal anatomical structure, the set of contours comprising a first subset of long-axis contours obtained based on a first set of long-axis images of the internal anatomical structure, the method comprising:

adjusting the set of contours, comprising adjusting the first subset of long-axis contours to correct for motion artefacts in the first set of long-axis images; and deforming a template three-dimensional (3D) surface mesh preconfigured for the internal anatomical structure's type into a deformed 3D surface mesh based on the adjusted set of contours to obtain the geometrical reconstruction of the internal anatomical structure.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 3 depicts an example computer system which the system according to various embodiments of the present invention may be embodied in.

FIGS. 7A and 7B illustrate a local coordinate system of a short-axis (SAX) plane 702 and a long-axis (LAX) plane 704, respectively;

FIGS. 8A and 8B depict an original set of contours and the corresponding registered set of contours (registered according to various example embodiments of the present invention), respectively, at a certain time frame;

FIGS. 9A to 9C depict an example initial template mesh for LA and LV according to various example embodiments of the present invention;

FIG. 11 depicts schematic perspective view of an example geometric reconstruction of the LA and LV at four different frames of a cardiac cycle after performing the mesh regularization as shown in FIG. 10;

DETAILED DESCRIPTION

Various embodiments of the present invention provide a method (computer-implemented method) and a system including a memory and at least one processor communicatively coupled to the memory) for geometrical reconstruction of an internal anatomical structure. For example, the internal anatomical structure may be one or more organs (or a part thereof) of the human or animal body, such as but not limited to, heart, lung(s), stomach, liver, and kidney(s).

Figure 1:
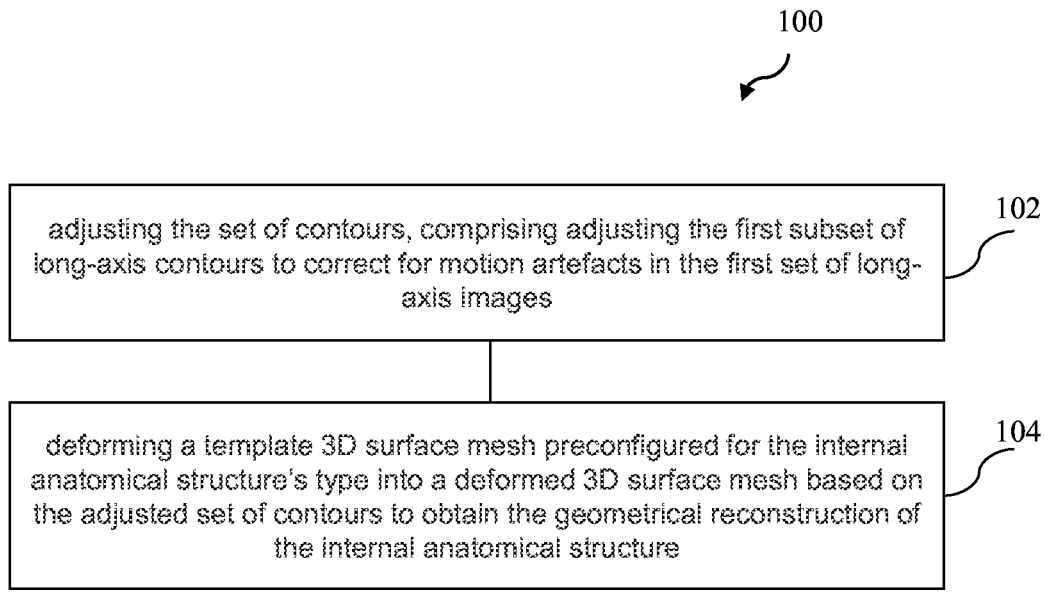
FIG. 1 depicts a schematic flow diagram of a method for geometrical reconstruction of an internal anatomical structure according to various embodiments of the present invention.

FIG. 1 depicts a schematic flow diagram of a method 100 (computer-implemented method) for geometrical reconstruction (in particular, three-dimensional (3D) geometrical reconstruction) of an internal anatomical structure using at least one processor according to various embodiments of the present invention. The geometrical reconstruction of the internal anatomical structure is based on a set of contours derived from the internal anatomical structure, the set of contours comprising a first subset of long-axis contours obtained based on a first set of long-axis images of the internal anatomical structure. For example and without limitation, the set of long-axis images of the internal anatomical structure may be obtained with respect to a long-axis view of the internal anatomical structure and at various angles (which may be predetermined as desired or as appropriate) about the long-axis based on magnetic resonance imaging (MRI). It will be appreciated by a person skilled in the art that the long-axis image may also be referred to as a long-axis 2D image, a long-axis cross-sectional image, a long-axis image plane, a long-axis frame or slice, or the like.

The method 100 comprises a step 102 of adjusting the set of contours, which comprises adjusting the first subset of long-axis contours to correct for motion artefacts in the first set of long-axis images; and a step 104 of deforming a template 3D surface mesh (which may simply be referred to as a "template mesh" herein) preconfigured for the internal anatomical structure's type (e.g., preconfigured specifically for the type of the internal anatomical structure, such as preconfigured for a heart) into a deformed 3D surface mesh (which may simply be referred to as a "deformed mesh" herein) based on the adjusted set of contours to obtain the geometrical reconstruction of the internal anatomical structure. Accordingly, the method 100 for geometrical reconstruction according to various embodiments of the present invention is advantageously obtained by deforming (which may also be interchangeably referred to as morphing or manipulating) a template 3D surface mesh that is preconfigured for the internal anatomical structure's type based on (or with respect to) a set of contours that has been adjusted to correct for motion artefacts. In various embodiments, the template 3D surface mesh may be deformed based on only the adjusted first subset of long-axis contours in the set of contours. In various other embodiments, the template 3D surface mesh may be deformed based on at least the adjusted first subset of long-axis contours in the set of contours, such as based on only each adjusted subset of long-axis contours in the set of contours, based on the adjusted first subset of long-axis contours and one or more other adjusted subsets (subset(s) of long-axis contours and/or subset(s) of short-axis contours), or based on each adjusted subset (subset(s) of long-axis contours and/or subset(s) of short-axis contours) in the set of contours. Such an approach has been found to enhance the quality of the geometrical reconstruction of the internal anatomical structure obtained, and thus enabling a more realistic and accurate geometrical reconstruction of the internal anatomical structure, such as compared to the conventional biplane area-length method or the conventional Simpson's method as explained in the background. It will be appreciated by a person skilled in the art that the template 3D surface mesh may be made up of a single surface mesh or a combination or set of two or more surface meshes, such as illustrated in FIGS. 9A and 9B described later below.

For example, in relation to step 102, images (e.g., long-axis images or short-axis images) obtained based on MRI in relation to the internal anatomical structure may undesirably contain motion artefacts due to movement of or motion by the internal anatomical structure when obtaining (capturing) the images. For example, movement of the internal anatomical structure may be caused by motion by the internal anatomical structure itself, motion by nearby internal anatomical structure (e.g., respiratory motion) and/or movement by the subject (e.g., patient). For example, while MRI images may be acquired over multiple phases (or frames) of the cardiac cycle in a short time period (e.g., about 12 seconds) to avoid errors induced by respiratory motions, the subject may not be able to hold his/her breath for prolonged time periods. Moreover, MRI images acquired over different breath-hold positions may also introduce errors due to variations from different heart beats. Accordingly, such factors contribute to misalignments in the MRI images obtained, which would result in inaccuracies in the geometrical reconstruction of the internal anatomical structure if not corrected. Therefore, the above-mentioned step 102 advantageously adjusts the set of contours to correct for motion artefacts (e.g., at least partially or substantially) in the images acquired for improving the quality of the geometrical reconstruction of the internal anatomical structure obtained.

In various embodiments, the step 102 of adjusting the set of contours further comprises determining, for each pair of long-axis contours in the first subset of long-axis contours, a first measure (e.g., first energy or cost measure) associated with the pair of long-axis contours based on a degree of superimposition (DOSi) (which may also interchangeably be referred to as a degree of superposition) between the pair of long-axis contours, and the above-mentioned adjusting the first subset of long-axis contours is based on a first function (energy or cost function) that is dependent on the first measure respectively determined for the above-mentioned each pair of long-axis contours (that is, dependent on all of such first measures determined). In various embodiments, different pairs of contours may overlap, or in other words, they may share a common contour.

For example, the DOSi between a first contour and a second contour may be determined based on a degree of overlap between a line segment across the first contour (i.e., subtended by the first contour) and a line segment of the second contour (i.e., subtended by the second contour) along a line of intersection between a first image plane containing the first contour and a second image plane containing the second contour. For example, if there is no overlap between the two line segments, the DOSi between the first and second contours may be zero. On the other hand, if the two line segments are perfectly coincident, then the DOSi between the first and second contours may be one. The first measure associated with the first and second contours (i.e., the first measure between the first and second image planes, for example, the energy contributed by interaction between the first and second image planes) may then be determined based on the DOSi between the first and second contours.

With the first measure associated with each pair of long-axis contours in the first subset of long-axis contours respectively determined, for example in the case of the first measure being a first energy measure, the total energy contributed by interactions between the long-axis contours in the first subset of long-axis contours may thus be determined, and the first subset of long-axis contours may advantageously be adjusted based on an energy function that is dependent on such a total energy determined, and in particular, with a view of minimizing the total energy (or with a view of minimizing the total cost in the case of the first measure being a first cost measure). Such a technique has been found to facilitate the correction of the motion artefacts in the first set of long-axis images obtained.

In various embodiments, the set of contours further comprises a second subset of short-axis contours obtained based on a second set of short-axis images of the internal anatomical structure, and the above-mentioned adjusting the set of contours further comprises adjusting the second subset of short-axis contours to correct for motion artefacts in the second set of short-axis images. Similar to the long-axis image, it will be appreciated by a person skilled in the art that the short-axis image may also be referred to as a short-axis 2D image, a short-axis cross-sectional image, a short-axis image plane, a short-axis frame or slice, or the like. Accordingly, various embodiments of the present invention take into account short-axis images of the internal anatomical structure, in addition to the long-axis images described hereinbefore, and similarly adjusts the second subset of short-axis contours to correct for motion artefacts in the second set of short-axis images.

In various embodiments, the above-mentioned step 102 of adjusting the set of contours further comprises determining, for each pair of long-axis contour in the first subset of long-axis contours and short-axis contour in the second subset of short-axis contours, a second measure (e.g., second energy or cost measure) associated with the pair of long-axis contour and short-axis contour based on a degree of superimposition (DOSi) between the pair of long-axis contour and short-axis contour, and the above-mentioned adjusting the first subset of long-axis contours and the above-mentioned adjusting the second subset of short-axis contours are based on the above-mentioned energy function that is further dependent on the second measure respectively determined for the above-mentioned each pair of long-axis contour and short-axis contour (that is, dependent on all of such second measures determined). The DOSi between a pair of long-axis contour and short-axis contour may be determined in a similar or the same manner as described hereinbefore between the first and second contours. Similarly, as described hereinbefore before, in various embodiments, different pairs of contours may overlap, or in other words, they may share a common contour.

With the second measure associated with each pair of long-axis contour and short-axis contour respectively determined, for example in the case of the second measure being a second energy measure, the total energy contributed by interactions between the long-axis contours in the first subset of long-axis contours and the short-axis contours in the second subset of short-axis contours may thus be determined, and the first subset of long-axis contours and the second subset of short-axis contours may advantageously be adjusted based on the above-mentioned energy function that is further dependent on such a total energy contributed by interactions between the long-axis contours and the short-axis contours (i.e., in addition to the total energy contributed by interactions between the long-axis contours as described hereinbefore), and in particular, with a view of minimizing the total energy (or with a view of minimizing the total cost in the case of the first and second measures being first and second cost measures) contributed by both types of interactions. Such a technique has been found to further facilitate the correction of the motion artefacts in the first set of long-axis images and the second set of short-axis images obtained.

In various embodiments, the above-mentioned adjusting the first subset of long-axis contours comprises translating one or more of the long-axis contours in the first subset of long-axis contours and the above-mentioned adjusting the second subset of short-axis contours comprises translating one or more of the short-axis contours in the second subset of short-axis contours, based on a minimization of the above-mentioned first function. That is, the above-mentioned adjusting the first subset of long-axis contours and the above-mentioned adjusting the second subset of short-axis contours are both performed based on a minimization of the above-mentioned energy function. In this regard, minimizing the above-mentioned first function (e.g., that is dependent on the first measure respectively determined for the above-mentioned each pair of long-axis contours and the second measure respectively determined for the above-mentioned each pair of long-axis contour and short-axis contour, or in other words, dependent on all of such first measures and second measures determined) has been found to enhance the proper alignment of the set of contours obtained, and thus, enhances the correction of the motion artefacts in the corresponding set of images initially obtained.

In various embodiments, the first set of long-axis images and the second set of short-axis images of the internal anatomical structure are obtained over one or more cycles associated with the internal anatomical structure, each cycle comprising a plurality of phases. In this regard, the above-mentioned determining the first measure and the above-mentioned determining the second measure are performed for (or with respect to) each of the plurality of phases, and the minimization of the above-mentioned first function is performed over the cycle (e.g., the entire cycle) associated with the internal anatomical structure. By way of an example and without limitation, MRI scanning may be performed using steady-state free precession cine gradient echo sequences. For example, in the case of the internal anatomical structure being a heart, a number of preliminary short-axis acquisitions may be used to locate the plane passing through the mitral and aortic valves. This allows the acquisition of the oblique long-axis plane of the left ventricle (e.g., 2-Chamber (2CH), 3-Chamber (3CH) and 4-Chamber (4CH) views), which is orthogonal to the short-axis plane and passes through the mitral valve, apex and/or aortic valve. True FISP (fast imaging with steady-state precession) magnetic resonance pulse sequence with segmented k-space and retrospective electrocardiographic gating may be used to acquire the images during a cardiac cycle. For example and without limitation, the field of view may be about 320 mm, and each image slice may be acquired in a single breath hold, with around 25 to 30 temporal phases per cardiac cycle. The short-axis and long-axis views (or planes) derived from the MRI may then be utilized to carry out the geometrical reconstruction of the heart according to various embodiments of the present invention. As a result, for example in the case of the first and second measures being the first and second energy measures, the total energy contributed by both of the above-mentioned types of interactions for each phase may thus be determined, and the first subset of long-axis contours and the second subset of short-axis contours may advantageously be adjusted based on the above-mentioned energy function that is dependent on such a total energy contributed by both of the above-mentioned types of interactions over the entire cycle, and in particular, with a view of minimizing the total energy contributed by both types of interactions over the entire cycle. Such a technique has been found to further enhance the correction of the motion artefacts in the corresponding set of images initially obtained.

In various embodiments, the step 104 of deforming the template 3D surface mesh comprises mapping, for each of a plurality of long-axis contours of the adjusted set of contours, source control points (which may interchangeably be referred to as "source feature points") on the template 3D surface mesh with respect to corresponding target control points (which may interchangeably be referred to as "target feature points") on the long-axis contours, respectively. For example, each of the plurality of long-axis contours may correspond to a respective desired view of the internal anatomical structure. By way of example only and without limitations, in the case of the internal anatomical structure being a heart, three long-axis contours may be provided corresponding to the 2-chamber (2CH) view, 3-chamber (3CH) view and 4-chamber (4CH) view of the heart, respectively. In this regard, each long-axis contour may have configured thereon a set of target control points, and a set of source control points on the template 3D surface mesh may thus be configured to respectively correspond to the set of target control points. Therefore, a plurality of sets of source and target control points may be provided for the plurality of long-axis contours (or for the plurality of desired views), respectively.

In various embodiments, the step 104 of deforming the template 3D surface mesh further comprises determining a weight parameter for each of the plurality of long-axis contours (of the adjusted set of contours), respectively, and the above-mentioned mapping is performed based on a mapping function that is dependent on the weight parameter respectively determined for the above-mentioned each of the plurality of long-axis contours (that is, dependent on all of such weight parameters determined). That is, a weight parameter is determined for each set of source and target control points (or in other words, for each of the plurality of corresponding image planes or imaging axes) such that the mapping function for mapping all source control points to all corresponding target control points advantageously take into account different weights assigned to different sets of source and target control points.

In various embodiments, the weight parameter is determined based on a distance between the long-axis contour of the plurality of long-axis contours (of the adjusted set of contours) and a corresponding long-axis contour of the template 3D surface mesh (that is, a long-axis contour of the template 3D surface mesh in an image plane corresponding to the image plane of the long-axis contour of the adjusted set of contours).

Therefore, various embodiments of the present invention are advantageously able to map multiple sets of source and target control points for every phase (or every frame) of a cycle relating to the internal anatomical structure in an efficient and accurate manner for obtaining the geometrical reconstruction for every phase of the cycle.

In various embodiments, the above-mentioned deforming the template 3D surface mesh comprises deforming the template 3D surface iteratively (e.g., at a second or subsequent stage of deforming the template 3D surface mesh), whereby for each iteration, the above-mentioned mapping is performed based on the mapping function that is dependent on the weight parameter respectively determined for the above-mentioned each of the plurality of long-axis contours, the weight parameter being determined based on the above-mentioned corresponding long-axis contour of the template 3D surface mesh deformed at the immediately preceding iteration. In other words, rather than mapping the initial source control points with respect to the corresponding target control points in only one step by the mapping function, at a second or subsequent stage of deforming the template 3D surface mesh, the source control points are iteratively updated based on the configuration of the template 3D surface mesh deformed at the immediately preceding iteration such that the mapping function is iteratively performed with respect to the iteratively updated source control points (which may also be referred to as real-time computation of the source control points), which has been found to enhance geometric conformity while preventing singularity.

It will be appreciated by a person skilled in the art that the present invention is not limited to only the first subset of long-axis contours and the second subset of short-axis contours described hereinbefore, and the set of contours may include one or more additional subset of long-axis contours (e.g., with respect to one or more different long-axis views) and/or one or more additional subset of short-axis contours (e.g., with respect to one or more different short-axis views) as appropriate or as desired, such as based on the type of internal anatomical structure being reconstructed.

Figure 2:
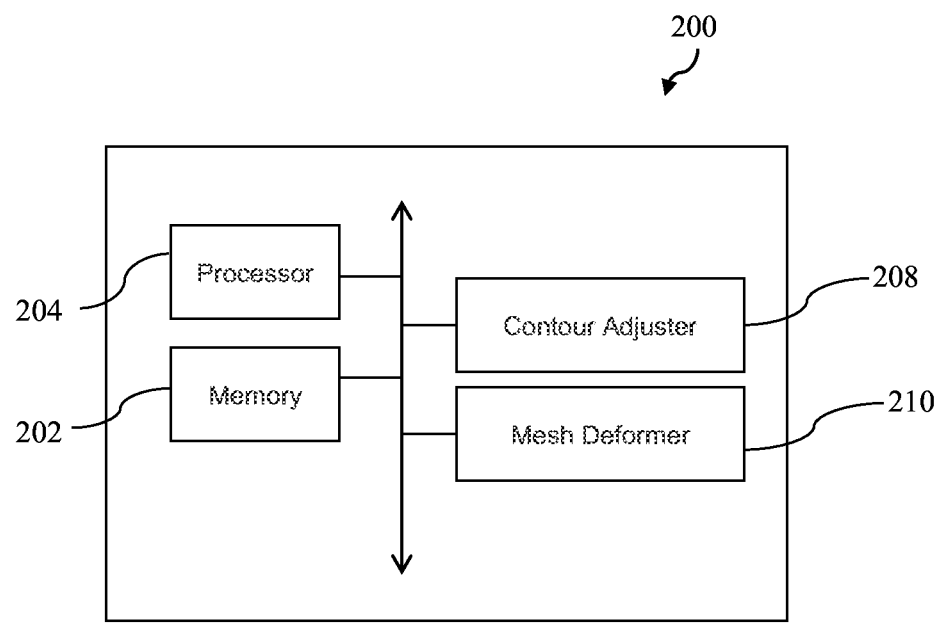
FIG. 2 depicts a schematic block diagram of a system for geometrical reconstruction of an internal anatomical structure according to various embodiments of the present invention, such as corresponding to the method according to FIG. 1.

FIG. 2 depicts a schematic block diagram of a system 200 for geometrical reconstruction of an internal anatomical structure according to various embodiments of the present invention, such as corresponding to the method 100 for geometrical reconstruction of an internal anatomical structure using at least one processor as described hereinbefore according to various embodiments of the present invention. Similarly, the system 200 for geometrical reconstruction of an internal anatomical structure is based on a set of contours derived from the internal anatomical structure, the set of contours comprising a first subset of long-axis contours obtained based on a first set of long-axis images of the internal anatomical structure.

The system 200 comprises a memory 202, and at least one processor 204 communicatively coupled to the memory 202 and configured to adjust the set of contours, comprising adjusting the first subset of long-axis contours to correct for motion artefacts in the first set of long-axis images; and deform a template 3D surface mesh preconfigured for the internal anatomical structure's type into a deformed 3D surface mesh based on the adjusted set of contours to obtain the geometrical reconstruction of the internal anatomical structure.

It will be appreciated by a person skilled in the art that the at least one processor 204 may be configured to perform the required functions or operations through set(s) of instructions (e.g., software modules) executable by the at least one processor 204 to perform the required functions or operations. Accordingly, as shown in FIG. 2, the system 200 may further comprise a contour adjuster (or contour adjusting module or circle) 208 configured to adjust the set of contours, comprising adjusting the first subset of long-axis contours to correct for motion artefacts in the first set of long-axis images; and a mesh deformer (or mesh deforming module or circuit) 210 configured to deform a template 3D surface mesh preconfigured for the internal anatomical structure's type into a deformed 3D surface mesh based on the adjusted set of contours to obtain the geometrical reconstruction of the internal anatomical structure.

It will be appreciated by a person skilled in the art that the above-mentioned modules are not necessarily separate modules, and one or more modules may be realized by or implemented as one functional module (e.g., a circuit or a software program) as desired or as appropriate without deviating from the scope of the present invention. For example, the contour adjuster 208 and the mesh deformer 210 may be realized (e.g., compiled together) as one executable software program (e.g., software application or simply referred to as an "app"), which for example may be stored in the memory 202 and executable by the at least one processor 204 to perform the functions/operations as described herein according to various embodiments.

In various embodiments, the system 200 corresponds to the method 100 as described hereinbefore with reference to FIG. 1, therefore, various functions or operations configured to be performed by the least one processor 204 may correspond to various steps of the method 100 described hereinbefore according to various embodiments, and thus need not be repeated with respect to the system 200 for clarity and conciseness. In other words, various embodiments described herein in context of the methods are analogously valid for the respective systems (e.g., which may also be embodied as devices), and vice versa.

For example, in various embodiments, the memory 202 may have stored therein the contour adjuster 208 and mesh deformer 210, which respectively correspond to various steps of the method 100 as described hereinbefore according to various embodiments, which are executable by the at least one processor 204 to perform the corresponding functions/operations as described herein.

A computing system, a controller, a microcontroller or any other system providing a processing capability may be provided according to various embodiments in the present disclosure. Such a system may be taken to include one or more processors and one or more computer-readable storage mediums. For example, the system 200 described hereinbefore may include a processor (or controller) 204 and a computer-readable storage medium (or memory) 202 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be a special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "adjusting", "deforming", "determining", "translating", "minimizing", "mapping" or the like, refer to the actions and processes of a computer system (e.g., which may also be embodied as an electronic device), that manipulates and transforms data represented as physical quantities within the computer system into other data similarly represented as physical quantities within the computer system or other information storage, transmission or display devices.

The present specification also discloses a system (e.g., which may also be embodied as a device or an apparatus) for performing the operations/functions of the methods described herein. Such a system may be specially constructed for the required purposes, or may comprise a general purpose computer or other device selectively activated or reconfigured by a computer program stored in the computer. The algorithms presented herein are not inherently related to any particular computer or other apparatus. Various general-purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention. It will be appreciated by a person skilled in the art that various modules described herein (e.g., the contour adjuster 208 and/or the mesh deformer 210) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions (e.g., corresponding to the contour adjuster 208 and/or the mesh deformer 210) executable by one or more computer processors to perform a method 100 for geometrical reconstruction of an internal anatomical structure as described hereinbefore with reference to FIG. 1. Accordingly, various computer programs or modules described herein may be stored in a computer program product receivable by a system therein, such as the system 200 as shown in FIG. 2, for execution by at least one processor 204 of the system 200 to perform the required or desired functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

It will be appreciated by a person skilled in the art that the system 200 may be embodied as a separate (stand-alone) unit or embodied as a functional unit/component of a larger system (e.g., a MRI scanner).

Figure 3:
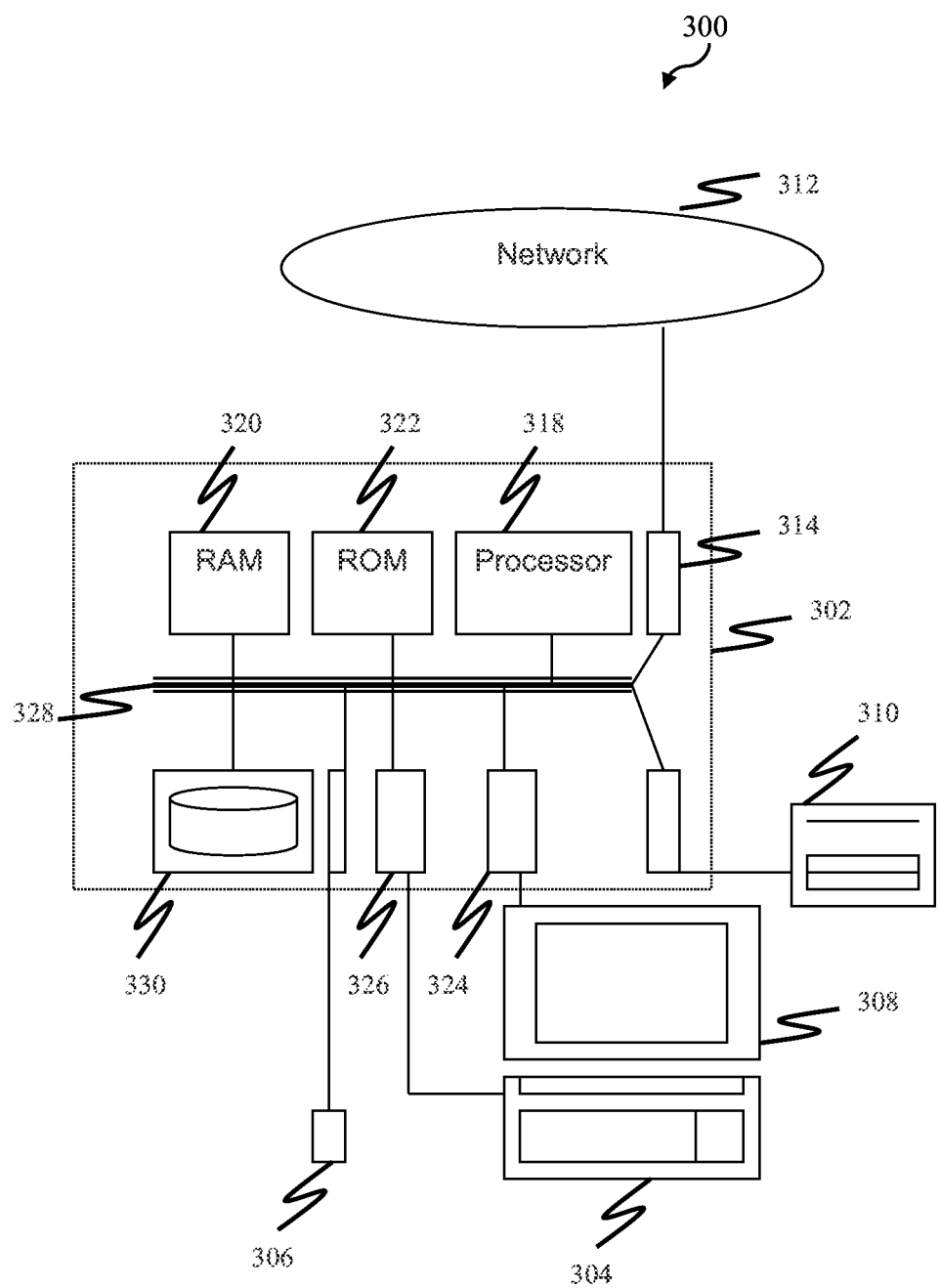

In various embodiments, the system 200 may be realized by any computer system (e.g., portable or desktop computer system, such as tablet computers, laptop computers, mobile communications devices (e.g., smart phones), and so on) including at least one processor and a memory, such as a computer system 300 as schematically shown in FIG. 3 as an example only and without limitation. Various methods/steps or functional modules (e.g., the contour adjuster 208 and/or the mesh deformer 210) may be implemented as software, such as a computer program being executed within the computer system 300, and instructing the computer system 300 (in particular, one or more processors therein) to conduct the methods/functions of various embodiments described herein. The computer system 300 may comprise a computer module 302, input modules, such as a keyboard 304 and a mouse 306, and a plurality of output devices such as a display 308, and a printer 310. The computer module 302 may be connected to a computer network 312 via a suitable transceiver device 314, to enable access to e.g., the Internet or other network systems such as Local Area Network (LAN) or Wide Area Network (WAN). The computer module 302 in the example may include a processor 318 for executing various instructions, a Random Access Memory (RAM) 320 and a Read Only Memory (ROM) 322. The computer module 302 may also include a number of Input/Output (I/O) interfaces, for example I/O interface 324 to the display 308, and I/O interface 326 to the keyboard 304. The components of the computer module 302 typically communicate via an interconnected bus 328 and in a manner known to the person skilled in the relevant art.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

In particular, for better understanding of the present invention and without limitation or loss of generality, various example embodiments of the present invention will now be described with respect to the internal anatomical structure being a heart of a subject (a person). However, it will be appreciated by a person skilled in the art that the present invention is not limited to the internal anatomical structure being a heart, and the method for geometrical reconstruction as disclosed herein according to various embodiments may be applied to reconstruct various types of internal anatomical structures, such as but not limited to, lung(s), stomach, liver, and kidney(s).

Various example embodiments of the present invention provide an automated approach for geometrical reconstruction and volume computation of both LA and LV using cardiac magnetic resonance imaging.

As mentioned in the background, a limitation of using either the conventional biplane area-length method or the conventional Simpson's method is that the volume computed is based on 2D images and not the actual 3D geometry of the LA. It has conventionally been challenging to obtain realistic 3D LA geometry based on CMR images because of the lower spatial resolution and intensity inhomogeneities that pose difficulties for automated segmentation algorithms. Various example embodiments of the present invention address the above-mentioned deficiency in conventional methods by using a mesh morphing algorithm/technique to morph a template LA-LV mesh (which may also be referred to as a model or a mesh model) into a subject-specific mesh based on the long-axis contours segmented from CMR images of the subject's heart.

Various example embodiments of the present invention include the following advantages: (i) the use of a multi-axis, multi-frame registration algorithm/technique to correct for motion artefacts in the CMR images, (ii) combined 3D geometrical reconstruction and volume computation of both the LA and LV throughout the entire cardiac cycle, and (iii) geometrical reconstruction of the mitral annulus plane. Accordingly, various example embodiments advantageously allow investigation into the interaction between the pumping volume of the LA and the LV for subjects with cardiac diseases. For example, conventional diagnostic of heart-failure (HF) patients relies primarily on evaluation of the LV and its function, and do not take into account contribution from the LA. However, LA dilation (enlargement) is known to be associated with the severity of the LV dysfunction. Therefore, combining the contribution of the LA through analysis of its pumping volume and its interaction with the LA according to various example embodiments of the present invention advantageously allows for the better characterization of the overall cardiac function for HF patients.

Accordingly, an advantage of the method for geometrical reconstruction according to various example embodiments is twofold: (i) the method is capable of relying on standard cardiac magnetic resonance imaging sequence that is used routinely for clinical examination. This is in contrast to various conventional methods for computing LA volumes either through the use of multi-slice computed tomography or special MRI sequences, and (ii) computation of the LA volume is performed using the actual 3D reconstructed geometry. This is in contrast to various conventional methods of using 2D measurements on the images (typically, using the 2CH and 4CH long-axis views) for volume measurement, such as in the biplane area-length and the Simpson's methods.

Figure 4:
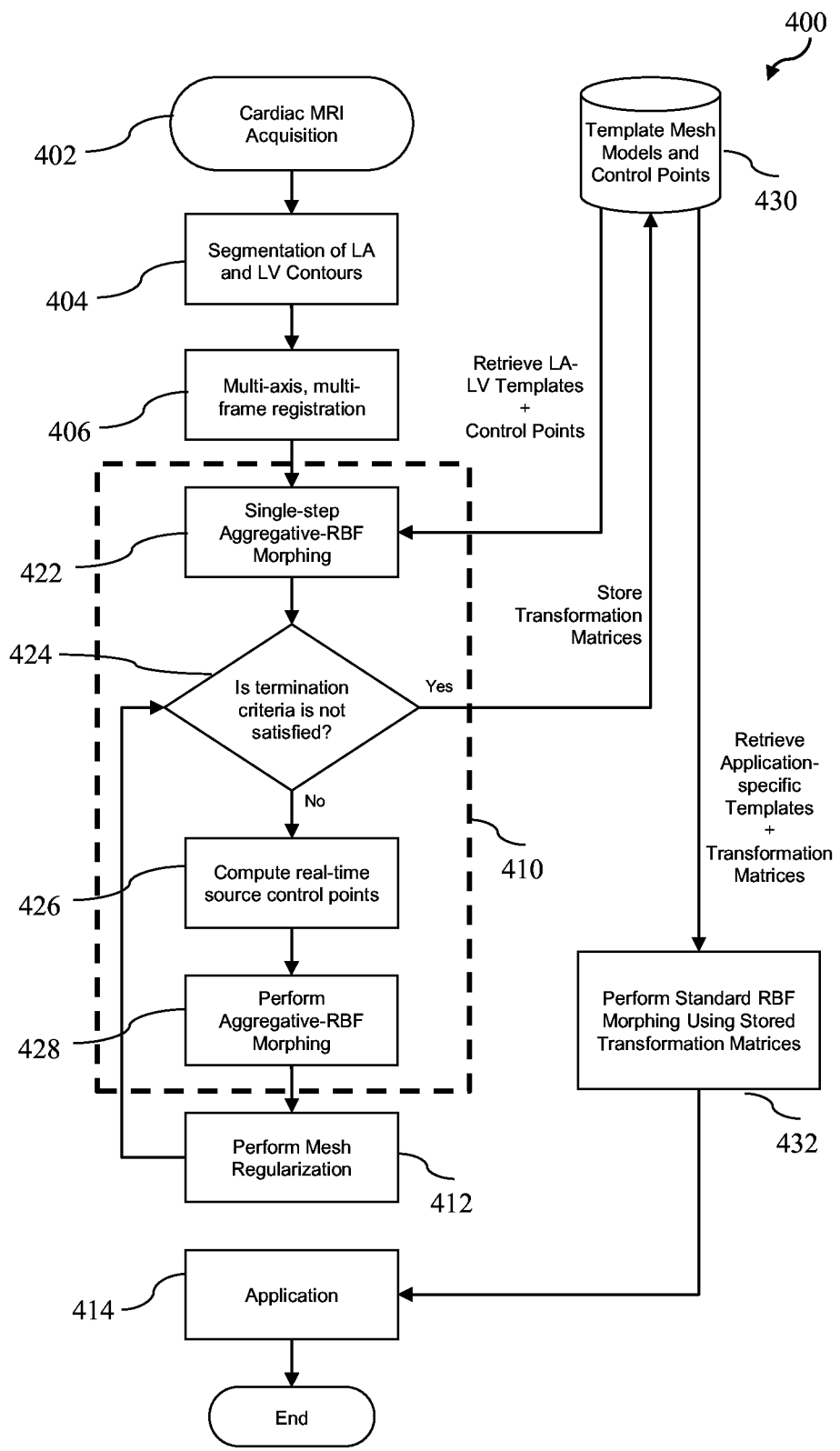
FIG. 4 depicts a flow diagram illustrating an overview of a method for the 3D geometrical reconstruction of LA-LV models according to various example embodiments of the present invention.

FIG. 4 depicts a flow diagram illustrating an overview of a method 400 for the 3D geometrical reconstruction of LA-LV models according to various example embodiments of the present invention. As shown, the method 400 includes the following stages/components:

Image acquisition stage/component 402. For example, standard cine-MRI protocol is used at this stage. This is advantageous as, for example, no additional requirement for acquiring CMR images is needed to implement the method 400.

Image segmentation stage/component 404. The contours of the LA and LV are extracted from the CMR images and used as initial inputs for the subsequent multi-axis, multi-frame registration stage/component 406. For example, this stage may be performed manually by an experienced radiographer using existing productivity tools, or may be performed automatically using specialized algorithms or computer programs configured for performing such contour extractions from images.

Multi-axis, multi-frame registration stage/component 406 (e.g., corresponding to the contour adjuster 208 as described hereinbefore according to various embodiments). This stage involves the correction of motion artefacts from CMR imaging through the use of a multi-axis, multi-frame registration approach/technique. This approach may rely on the minimization of a suitable energy function that is dependent on the subject-specific long-axis contours and short-axis contours.

Aggregative-RBF (Radial Basis Function) morphing stage/component 410 (e.g., corresponding to the mesh deformer 210 as described hereinbefore according to various embodiments). At this stage, template models (template meshes) of the LA and LV are morphed with respect to the subject-specific long-axis contours (e.g., corresponding to the adjusted set(s) of long-axis contours as described hereinbefore according to various embodiments) for every frame in the cardiac cycle, creating a one-to-one corresponding model (deformed mesh) for the entire cardiac cycle. This may be achieved by a combined geometrical reconstruction of both the LA and LV based on mesh morphing algorithm/technique according to various example embodiments. In various example embodiments, source control points are advantageously computed in real-time (e.g., updated iteratively) to ensure geometric conformity while preventing singularity.

Mesh regularization stage/component 412. At this stage, additional mechanical properties may be incorporated into the method 400 to ensure that the morphing is mechanically and materially plausible through a mesh regularization procedure/technique based on hyperelastic energy minimization.

Application-specific retrieval stage/component 414. At this stage, to support different types of applications, use-case specific templates (application-specification geometrical meshes) may be created, retrieved and transformed. For example, in the case of the internal anatomical structure being a heart according to various example embodiments, LA and LV chamber volume computation application may be used to enable the study of the interaction of pumping dynamics between the LA and LV chambers. As described hereinbefore, it will be appreciated by a person skilled in the art that the present invention is not limited to the internal anatomical structure being a heart, and thus the present invention is not restricted to such a LA and LV chamber volume computation application.

For better understanding of the present invention and without limitation or loss of generality, the above-mentioned stages/components of the method 400 for the 3D geometrical reconstruction of LA-LV models according to various example embodiments of the present invention will now be described in further detail below.

Image Acquisition Stage 402

In example experiments, all subjects underwent CMR scanning balanced turbo field echo (BTFE) sequence imaged on a 3.0 T Philips scanner (Ingenia, Philips Healthcare, Netherlands) with a dStream Torso coil (maximal number of channels is 32). BTFE end-expiratory breath hold cine images were acquired in multi-planar short-axis and long-axis views. MRI scanning was performed using steady-state free precession cine gradient echo sequences. A number of preliminary short-axis acquisitions were used to locate the plane passing through the mitral and aortic valves. This allows the acquisition of the oblique long-axis plane of the left ventricle (e.g., 2CH, 3CH and 4CH views), which is orthogonal to the short-axis plane and passes through the mitral valve, apex and/or aortic valve. True FISP magnetic resonance pulse sequence with segmented k-space and retrospective electrocardiographic gating was used to acquire the images during a cardiac cycle. The field of view was about 320 mm, and each image slice was acquired in a single breath hold, with 30 temporal phases per cardiac cycle. The short-axis and long-axis views (or planes) derived from the MRI was then utilized to carry out the geometrical reconstruction of the heart according to various example embodiments of the present invention. In particular, a first set of images (short-axis images) was taken along the plane that passes through the mitral and aortic valves of the heart. A second set of images (long-axis images) was taken on planes orthogonal to the above-mentioned short-axis images, and the images are oblique to each other (for example and without limitation, about 60 degrees from each other), giving an angular cross-sectional view of the LV. A third set of images was taken on the vertical cross-section (long-axis images) orthogonal to and connecting with the above-mentioned short-axis plane images. The CMR images have a spatial resolution of 1.5 mm in-plane and 8 mm out-of-plane, acquired in a single breath hold, with 30 temporal phases per cardiac cycle. For example, the number of images obtained per cardiac cycle may be around 20 to 40.

Image Segmentation Stage/Component 404

In example experiments, image segmentation was performed on both the short-axis and long-axis CMR images using the MR post-processing software Medis "Qstrain" (Version 2.0, Medis Medical Imaging Systems, Leiden, Netherlands). Manual delineation of the LA and LV contours were performed by an experienced radiographer at the end-diastole and end-systole frames. Segmentation at all subsequent frames was performed by a software utilizing a feature tracking algorithm. For the short-axis images, segmentation for the LV includes all images from the most apical LV image slice to the image slice just below the mitral valve, and segmentation for the LA includes all images from above the mitral valve to the most basal LA images slice. For the long-axis images, segmentation on the LA and LV was performed on 2CH, 3CH and 4CH views.

Registration Stage 406

When using breath-hold cine Magnetic Resonance Imaging (MRI) for cardiac assessment, the quality of the acquisition may often be affected by factors such as respiration and patient movement. While MRI scans can be acquired over multiple phases (or frames) of the cardiac cycle in a short time period (e.g., about 12 seconds) to avoid errors induced by respiratory motions, a subject may not be able to hold their breath for prolonged time periods. Moreover, MRI data acquired over different breath-hold positions may also introduce errors due to variations over different heart beats. From the perspective of 3D and 4D reconstruction, the above issues contribute to misalignments in the MRI data, which would result in inaccuracies in the geometrical reconstruction of the internal anatomical structure if not corrected.

To address the above issues, various example embodiments make use of information extracted from the multiple imaging planes over the whole cardiac cycle to harmonize the positions of the individual images (individual contours) by minimizing a suitable energy function. For ease of description and without limitation, the registration stage 406 will now be described further with reference to an example of left heart reconstruction using the short-axis (SAX) view, the 2CH view, and the 3CH view.

Figure 5A:
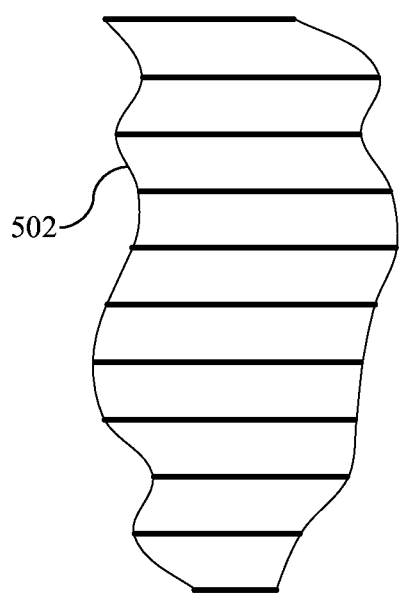
FIGS. 5A and 5B depict a schematic cross-sectional view of an example reconstructed LV mesh from MRI data containing motion artifacts and a schematic cross-sectional view of an example reconstructed LV mesh with motion artifacts corrected according to various example embodiments of the present invention, respectively.
Figure 5B:
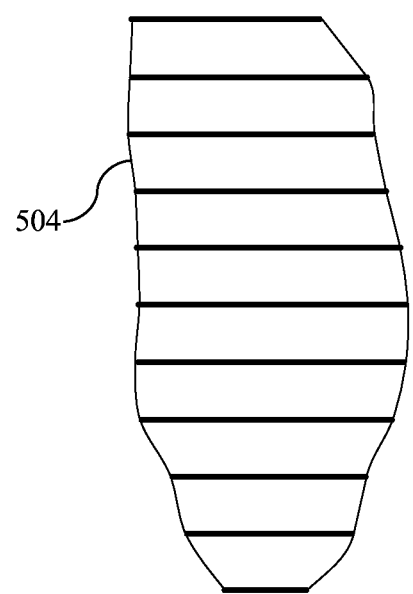

As an example illustration, FIG. 5A depicts a schematic cross-sectional view of an example reconstructed 3D LV mesh 502 from MRI data containing motion artifacts. In this regard, various example embodiments seek to achieve a sufficiently smooth LV mesh (deformed mesh) by applying the registration stage 406 to remove or mitigate the motion artifacts, such as the example reconstructed 3D LV mesh 504 as shown in FIG. 5B, which can be seen is a significant improvement over the reconstructed 3D mesh 502 shown in FIG. 5A based on the same initial set of contours.

In various example embodiments, the following nomenclature and definitions apply:

$v = (x_i, y_i, z_i)$ is a vertex in 3D;

$C = \{v_i | i = 1, 2, 3, \ldots, k\}$ is a closed contour consisting of a set of ordered vertices v, where k is the total number of vertices. The ordered vertices in C are cyclic, i.e., $v_m$ is connected to $v_1$, since they represent a closed connected curve;

$\{C_{SAX}\}_t$ represents a set (or stack) of segmented endocardial contours of the left heart on the short-axis image at a particular time frame t, where $\|\{C_{SAX}\}_t\|$ is the number of short-axis image. Therefore, $\|\{C_{SAX}\}_t\| = m$ when there are m short-axis images in the set;

$\{C_{LAX}\}_t$ represents a set (or stack) of segmented endocardial contours of the left heart on the long-axis image at a particular time frame t, where $\|\{C_{LAX}\}_t\|$ is the number of long-axis image. For example, $\|\{C_{LAX}\}_t\| = 2$ for a dataset that contains the 2CH and 3CH views; and $\Pi$ is a plane in 3D which contains C.

Degree of Superimposition (DOSi)

Figure 6A:
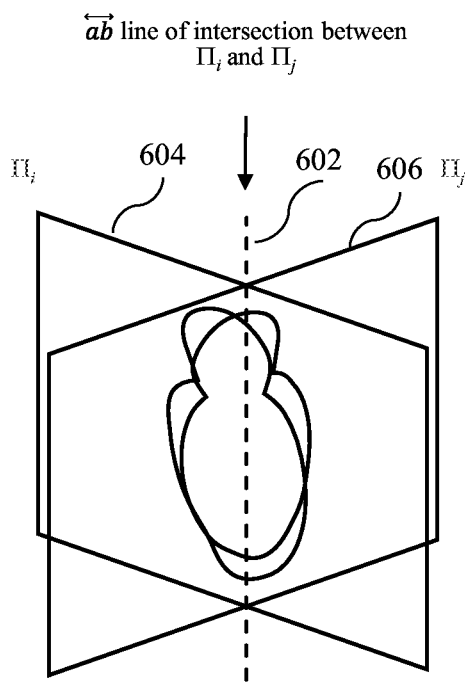
FIGS. 6A to 6D depict an example method of determining a degree of superimposition between two contours according to various example embodiments of the present invention.
Figure 6B:
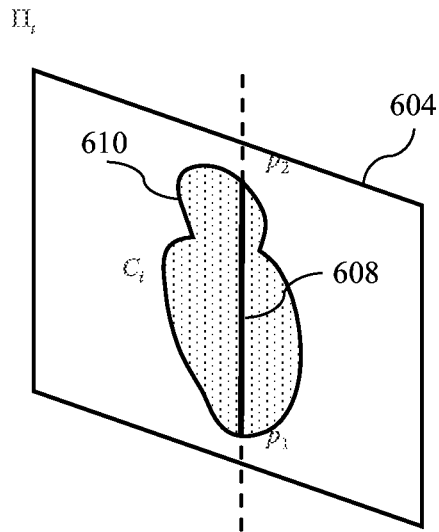
Figure 6C:
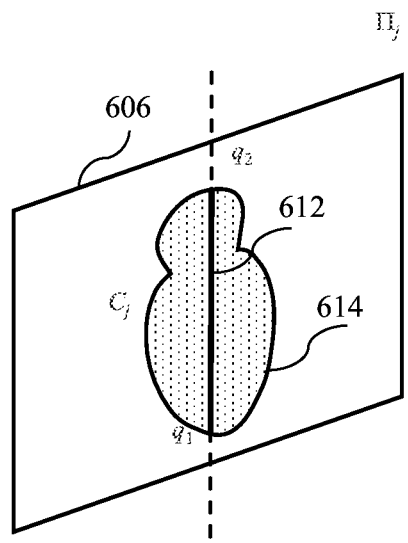

In various example embodiments, optimization is achieved by minimizing the degree of superimposition (DOSi) between $\{C_{SAX}\}_t$ and $\{C_{LAX}\}_t$ for $t \in \{1, 2, \ldots, N\}$ where N is the number of frames (phrases) in the cardiac cycle. In this regard, the DOSi between two contours extracted from two different imaging planes $\Pi_i$ and $\Pi_j$ may be defined or determined as follows, with reference to FIGS. 6A to 6D as an illustrative example:

1. obtain the line of intersection $\overline{ab}$ 602 between the two image planes $\Pi_i$, 604 and $\Pi_j$ 606, as for example illustrated in FIG. 6A;
2. for the first plane $\Pi_i$ 604, obtain the line segment $\overline{p_1p_2}$ 608 that is subtended by the interior of the segmented contour $C_i$ 610 in $\Pi_i$ 604, i.e., $\overline{p_1p_2} = \overline{ab} \cap C_i$ as for example illustrated in FIG. 6B;
3. for the second plane $\Pi$ 606, obtain the line segment $\overline{q_1q_2}$ 612 that is subtended by the interior of the segmented contour $C_j$ 614 in $\Pi_j$ 606, i.e., $\overline{q_1q_2} = \overline{ab} \cap C_j$, as for example illustrated in FIG. 6C; and
4. the DOSi between $C_i$ 612 and $C_j$ 614 may then calculated using the following equation:

$$DoSi = \frac{2|\overline{p_1p_2} \cap \overline{q_1q_2}|}{|\overline{p_1p_2}| + |\overline{q_1q_2}|} \quad \text{(Equation 1)}$$

In other words, according to Equation 1, the DOSi is two times the overlap divided by the sum of lengths of the two line segments. For example, if there is no overlap between the two line segments, then DOSi=0. On the other hand, if the two line segments are perfectly coincident, i.e., $p_1 = q_1$ and $p_2 = q_2$, then DOSi=1. In various example embodiments, a possible candidate for an energy function (e.g., corresponding to the "first measure" and/or the "second measure" as described hereinbefore according to various embodiments) between $\Pi_i$ 604 and $\Pi_j$ 606 may be defined as:

$$E_{i,j} = (1 - DoSi)_{i,j} \quad \text{(Equation 2)}$$

Figure 6D:
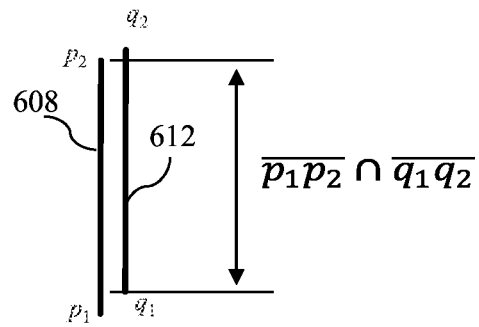

Accordingly, FIGS. 6A to 6D illustrate the DOSi between two contours $C_i$ 610 and $C_j$ 614, whereby FIG. 6A illustrates the line of intersection 602 between the planes $\Pi_i$ 604 and $\Pi_j$ 606, FIG. 6B illustrates the line segment 608 contained in and subtended by the contour 610 of the first plane 604, FIG. 6C illustrates the line segment 612 contained in and subtended by the contour 614 of the second plane 606, and FIG. 6D illustrates the superimposition of the two line segments 608, 612.

Variables and Constraints

To minimize the energy function $E_{i,j}$, various example embodiments apply changes to the imaging planes such that the respective line segments $\overline{p_1p_2}$ and $\overline{q_1q_2}$ are correspondingly modified. A computationally-efficient approach/technique is to perform translation on the imaging plane such that the translation vector is along the imaging plane. In other words, for an imaging plane $\Pi$ with local coordinate system $\langle x'|y'|z' \rangle$ whereby $z' \perp \Pi$, the translation is applied in the directions of x' and y' only. Such an approach may be considered as a semi-rigid mesh modification since the shape of the contours are maintained while shifting their respective position. As an example, FIGS. 7A and 7B illustrate the local coordinate system of a short-axis (SAX) plane 702 and a long-axis (LAX) plane 704, respectively.

Total Energy of System

As there are multiple SAX planes and LAX planes in a MRI dataset, it is noted in various example embodiments of the present invention that the energy in the system is contributed by interactions between the SAX and LAX planes, as well as interactions between the LAX and LAX planes, which may be defined as:

$$F_1 = \sum_{j=1}^{n} \sum_{i=1}^{m} E_{i,j} \quad \text{(Equation 3)}$$

$$F_2 = \sum_{j=1}^{n} \sum_{i=1}^{n} E_{i,j} \, | \, i \neq j$$

where $F_1$ (e.g., corresponding to the first function that is dependent on the first measure respectively determined for each pair of long-axis contours as described hereinbefore according to various embodiments) is the energy contributed by SAX-LAX interactions, $F_2$ is the energy contributed by LAX-LAX interactions, m is the number of SAX planes and n is the number of LAX planes.

Accordingly, in various example embodiments, the total energy (F) (e.g., corresponding to the first function that is further dependent on the second measure respectively determined for each pair of long-axis contour and short-axis contour as described hereinbefore according to various embodiments) in the system (associated with the MRI dataset) over the whole cardiac cycle may be defined as:

$$F = \sum_{t=0}^{N} F_1 + F_2 \quad \text{(Equation 4)}$$

where N is the number of frames (phases) in the cine-MRI sequence (the whole cardiac cycle).

In various example embodiments, Equation (4) is expressed as a multivariate function F(x) whereby x contains the translation components for every MRI plane. Accordingly, there are a total of 2 (m+n) variables in x, where m is the number of SAX planes; and n is the number of LAX planes. Therefore, x may be expressed as:

$$x = \begin{Bmatrix} x_1 & = & \Delta x'_1 \\ x_2 & = & \Delta y'_1 \\ x_3 & = & \Delta x'_2 \\ x_4 & = & \Delta y'_2 \\ \vdots & \vdots & \vdots \\ x_{2m-1} & = & \Delta x'_m \\ x_{2m} & = & \Delta y'_m \\ x_{2m+1} & = & \Delta x''_1 \\ x_{2m+2} & = & \Delta y''_1 \\ \vdots & \vdots & \vdots \\ x_{2(m+n)-1} & = & \Delta x''_n \\ x_{2(m+n)} & = & \Delta y''_n \\ x_{2(m+n)} & = & \Delta y''_n \end{Bmatrix}$$ (Equation 5)

where $\Delta x'$ and $\Delta y'$ are the translation components in the local x-coordinate and y-coordinate directions of a SAX plane, respectively; $\Delta x''$ and $\Delta y''$ are the translation components in the local x-coordinate and y-coordinate directions of a LAX plane, respectively.

In various example embodiments, each of the variables $x_i$ in F(x) is subjected to a bounded-constraint, which may be expressed as:

$$lb_i \leq x_i \leq ub_i$$ (Equation 6)

where $lb_i$ and $ub_i$ are the lower and upper bounds of $x_i$, respectively. In various example embodiments, the variables are constrained to translate within a bound of ±20 mm, that is, $lb_i = -20$ and $ub_i = +20$. For example, such a value is consistent with what was observed experimentally, whereby the maximum displacement recorded upon inhalation was 23.5 mm In this regard, it will be appreciated by a person skilled in the art that the above-mentioned range of ±20 mm is determined empirically, but with reference to the maximum observed range of 23.5 mm. However, it will be appreciated by a person skilled in the art that the lower and upper bounds of $x_i$ are not limited to the above-mentioned values and may be modified as desired or as appropriate, such as based on the type of internal anatomical structure being reconstructed and/or the quality of the set of images of the internal anatomical structure initially obtained.

Minimization

Accordingly, in various example embodiments, the minimization problem (e.g., corresponding to "a minimization of the first function" as described hereinbefore according to various embodiments) may be expressed as:

$$\min_x(F(x)), \text{ subject to } x \in (-20, 20)$$ (Equation 7)

In addition, the gradient $g_i$ associated with each variable $x_i$ may be defined such that:

$$g_i = \frac{\partial F(x)}{\partial x_i}$$ (Equation 8)

Since F(x) is not in a convenient analytical form, various example embodiments approximate $g_i$ using finite differences. In an example, the forward difference method is applied to approximate the gradient, that is:

$$g_i = \frac{F(x_i, \cdots, x_i + \varepsilon_i, \cdots, x_{2(m+n)}) - F(x_1, \cdots, x_i, \cdots, x_{2(m+n)})}{\varepsilon_i}$$ (Equation 9)

where $\varepsilon_i$ is a small increment in $x_i$.

The above-described minimization problem may be solved using an appropriate optimization routine, such as the L-BFGS-B algorithm which is adept at solving multivariate nonlinear bound constrained optimization problems. Such an algorithm is based on the gradient projection method and uses a limited-memory BFGS matrix to approximate the Hessian of the objective function. The algorithm does not store the results from all iterations but only a user-specified subset. An advantage of the algorithm is that it makes simple approximations of the Hessian matrices which are satisfactory for a fast rate linear convergence and requires minimal storage.

As an example illustration, FIGS. 8A and 8B depict the original set of long-axis and short-axis contours and the registered set of long-axis and short-axis contours (by the multi-axis, multi-frame frame registration 406 performed on the original set of contours extracted from an actual cine-MRI acquisition), respectively, at a particular time frame. In particular, as can be seen from FIGS. 8A and 8B, the motion artefacts in the original set of contours are clearly visible, which have been substantially corrected for in the registered set of contours according to various example embodiments of the present invention.

Mesh Morphing/Deforming Stages 410

In various example embodiments, the geometrical reconstruction of the LA and LV is performed by morphing a combined LA and LV template model (template mesh) using the subject-specific long-axis (e.g., corresponding to the adjusted set(s) of long-axis contours as described hereinbefore according to various embodiments), resulting in a one-to-one corresponding mesh (deformed mesh) for the entire cardiac cycle. Such an approach has been found to provide a number of advantages. For example, an advantage is that it is less sensitive to segmentation noises as the reconstruction is based on the long-axis CMR images where the LA and LV can be easily identified. This is in contrast to using short-axis images where the separation between the LA and LV (i.e., the mitral valve plane) is difficult to identify as the mitral valve plane is non-coplanar with the imaging plane. Hence, segmentation of the LA and LV from the short-axis images close to the mitral valve plane may not be sufficiently accurate to facilitate geometrical reconstruction. Another advantage is that the use of a template mesh allows for the identification of the mitral valve plane without any additional user inputs.

For ease of description and without limitation, the mesh morphing stage 410 will now also be described with respect to an example of LA and LV reconstruction using the 2CH view, 3CH view and 4CH view. The nomenclature and definitions for the mesh morphing stage 410 are the same as described hereinbefore with respect to the registration stage 406.

Definition of Template Mesh1 (Template Model)

The template mesh used in various example embodiments is an idealised geometry that is constructed using primitive shapes to mimic key anatomical features of the LA and LV geometry, as for example shown in FIGS. 9A to 9C. Accordingly, it will be appreciated by a person skilled in the art that for other types of internal anatomical structures (e.g., other types of organs), respective template meshes may be constructed using respective primitive shapes to mimic respective key anatomical features of such other types of internal anatomical structures, which are within the scope of the present invention. For example, the idealised LA is represented as a partial ellipsoid 902 with the mitral valve plane 904 represented by an inclined plane. Similarly, the LV is also represented as the union of a partial ellipsoid 906 with an idealised cylinder (representing the LV outflow tract). Controls points (source control points) for the LA and LV corresponding to the 2CH, 3CH and 4CH views are also defined on the idealised template mesh 900 (being a set of LA and LV template meshes 902, 906) based on the following heuristics:

i. The 3CH plane is defined as the plane that is perpendicular to the minor-axis of the LV ellipsoid and divides the LV outflow tract into two equal volumes (see FIG. 9C). Following this, the 3CH LA and LV contours are defined by the intersection of the 3CH plane with the template mesh 900. Source control points 910 for the 3CH LA and LV contours are generated by resampling these two contours at regular intervals.

ii. The 2CH plane is defined by rotating the 3CH plane anti-clockwise by 60° about the positive z-axis (positive direction is from base of LV to mitral valve plane). The z-axis is defined as the line passing through the centre of symmetry of the LV ellipsoid and is perpendicular to the minor-axis of the LV ellipsoid. Source control points 908 for the 2CH LA and LV contours are defined similarly as in point (i) above.

iii. The 4CH plane is defined by rotating the 3CH plane clockwise by 60° about the positive z-axis. Source control points 912 for the 4CH LA and LV contours are defined similarly as in point (i) above.

The source control points 908, 910, 912 may then be used for the subsequent mesh morphing procedures. Based on the three long-axis views used for illustrations, a total of six sets of source controls points are provided (or defined), namely, three sets for the LA and three sets for the LV (with each long-axis view contributing to two sets of source control points). It will be appreciated that the present invention is not limited to three long-axis views and more than three long-axis views (N>3) may be applied as desired or as appropriate. For example, in the case of N>3, it can be understood that the only modification required is in the computation of the source control points and the definition of the imaging plane used in the heuristics defined above.

Accordingly, FIG. 9A depicts an example template mesh 900, being a set of LA and LV template meshes 902, 906, used for LA and LV reconstruction and FIG. 9B illustrates the example LA and LV template meshes 902, 906 (surface meshes with opening) in an exploded or separated view, whereby the long-axis source control points are represented by black dots 908, 910, 912. For illustration purpose only, there are three sets of long-axis source control points 908, 910, 912 defined in the set of template mesh corresponding to the 2CH, 3CH and 4CH planes, respectively. The dotted planar surface in FIG. 9B represents the interface between the LV and LA template meshes 902, 906. FIG. 9C illustrates the definition of the 3CH plane with its corresponding source control points 912.

Mesh Morphing Based on Aggregative Radial Basis Function (RBF) Method

Various example embodiments of the present invention advantageously provide an aggregative-RBF method capable of handling scenarios where more than one set of source and target control points exist. In addition, these different sets of source and control points do not necessary conform to geometrical accuracy such that they are consistent with each other. This is a common scenario in real-world medical imaging problems where different acquisition planes may be taken at different time points. Prior to describing the aggregative-RBF method, for better understanding, the conventional RBF method will first be described below.

Standard RBF Method

Given two sets of n corresponding control points $S=\{p_i\} \subset \mathbb{R}^3$ (set of source control points) and $T=\{q_i\} \subset \mathbb{R}^3$ (set of target control points) (i=1, ..., n), a Radial Basis Function (RBF) $f: \mathbb{R}^3 \to \mathbb{R}^3$ is to be determined such that:

$$q_i = f(p_i) + p_i (i=1, \ldots, n) \quad \text{(Equation 10)}$$

RBFs are a popular technique for interpolating scattered data for its ability to deal with (handle) irregular sets of data in multi-dimensional space in approximating high dimensional smooth surfaces. In various example embodiments, the interpolant using RBFs is a function that returns the displacement value for each vertices of the template mesh $\Omega_S$ that takes it from the original position to its position in the target form. The displacements $u_i = q_i - p_i$ are known for the source control points $p_i$ and the target control points $q_i$. These displacements are utilized to construct the interpolating function $f(v)$ that returns the displacement for each generic mesh vertex v. Such a mapping can be expressed by a weighted linear combination of n basis functions defined by the source feature points (corresponding to the "source control points" described hereinbefore) and an additional explicit affine transformation as follows:

$$f(v) = \sum_{i=1}^{n} c_i \phi(\|v - p_i\|) + Rv + t \quad \text{(Equation 11)}$$

where $V \in \mathbb{R}^3$ is a vertex of $\Omega_S$, $c_i \in \mathbb{R}^3$ are (unknown) weights, $\phi$ is the radial basis function which is a real valued function on [0,1), $\|\cdot\|$ denotes the Euclidean norm, $R \in \mathbb{R}^{3 \times 3}$ adds rotation, skew, and scaling, and $t \in \mathbb{R}^3$ is a translation component.

The function $\phi$ is defined by the source feature points. Popular choices for RBFs include the thin-plate spline $\phi(r) = r^2 \log(r)$, the Gaussian $\phi(r) = \exp(-pr^2)$, the multi-quadric $\phi(r) = \sqrt{r^2 + \rho^2}$, and the biharmonic $\phi(r) = r$. Various pros and cons of the above functions have been discussed in the art. In various example embodiments, the multi-quadric function is used, which places no restrictions on the locations of the feature points. The multi-quadric function may be defined as:

$$\phi(r_i) = \sqrt{r_i^2 + \rho_i^2} \quad \text{(Equation 12)}$$

where $r_i$ is the distance function from the source feature point $p_i$, and $\rho_i$ is the stiffness radius controlling the stiffness of the deformation around $p_i$. The value of $\rho_i$ is determined as the Euclidean distance to the nearest other source feature point:

$$\rho_i = \min_{i \neq j} \|p_j - p_i\|, i, j = 1, \ldots, n \quad \text{(Equation 13)}$$

Setting up a system of linear equations relating source and target feature points, the unknowns $c_i$, R, and t can be solved for simultaneously. The interpolation conditions of Equation (10) lead to a linear system of n equations:

$$f(p_i) = q_i - p_i = u_i, i = 1, \ldots, n \quad \text{(Equation 14)}$$

To remove affine contributions from the weighted sum of the basis functions, various example embodiments of the present invention include additional constraints as follows:

$$\Sigma_{i=1}^{n} c_i = 0, \Sigma_{i=1}^{n} c_i^T p_i = 0 \quad \text{(Equation 15)}$$

The linear system of Equations (14) and (15) can be conveniently represented in a matrix form. In various example embodiments, three matrices are first constructed as follows:

$$\Phi = \begin{pmatrix} \phi(p_1 - p_1) & \cdots & \phi(p_1 - p_n) \\ \vdots & \ddots & \vdots \\ \phi(p_n - p_1) & \cdots & \phi(p_n - p_n) \end{pmatrix} \in \mathbb{R}^{n \times n},$$ (Equation 16)

$$P = \begin{pmatrix} p_1^T & 1 \\ \vdots & \vdots \\ p_1^T & 1 \end{pmatrix} \in \mathbb{R}^{n \times 4},$$

$$B = (u_1 \cdots u_n\ 0\ 0\ 0\ 0)^T \in \mathbb{R}^{(n+4) \times 3}.$$

Next, a linear system of the form AX=B is set up with:

$$A = \begin{pmatrix} \Phi & P \\ P^T & 0 \end{pmatrix} \in \mathbb{R}^{(n+4) \times (n+4)},$$ (Equation 17)

$$X = (c_1 \cdots c_n\ R\ T)^T \in \mathbb{R}^{(n+4) \times 3}.$$

The above linear system can be solved using a standard LU decomposition with pivoting. Using the predefined interpolating function as given in Equation (11), the displacement vectors for all vertices of $\Omega_S$ are computed to obtain the deformed shape of the template mesh, that is, the deformed mesh (note that the connectivity of the deformed mesh is not changed).

Aggregative RBF Method

The above standard RBF method described the mathematical approach to perform a single RBF mesh morphing. In the scenario where multiple sets of source and target control points exist, complications would arise. For example, the multi-axis nature of cardiac MRI is a good example of such a scenario where the contours extracted from each imaging axis represents one set of target control points. Furthermore, when control points are close to one another, there may be situations where the morphing will breakdown due to singularity. Once again, in the case of cardiac MRI where each axis can be acquired from different heartbeat (and therefore different time points), there is no guarantee that the data acquired will match accurately.

To address or at least mitigate these problems, various example embodiments of the present invention advantageously provide an aggregative-RBF approach/technique, which may be expressed as:

$$F(v) = \frac{\sum_{i=1}^{N} w_i f_i(v)}{\sum_{i=1}^{N} w_i}$$ (Equation 18)

where N is the number of sets of source-target control points, $f_i$ is the RBF functional that takes the form as shown in Equation (11), and $w_i$ is the weight (e.g., corresponding to the "weight parameter" as described hereinbefore according to various embodiments) ascribed to each set of source-target control points. For a multi-axis reconstruction, each long-axis plane would produce its respective set of source-target control points, e.g., in the case where 2CH, 3CH and 4CH views are used for reconstruction, N=3.

In various example embodiments, a suitable weight $w_i$ may be determined in the following manner. Considering a particular acquisition plane $\Pi_i$ at the k-th iteration of the aggregative-RBF procedure/technique, find the intersection between $\Pi_i$ and the current configuration of the LA-LV mesh model $\Omega_k$. This produces a contour $C_{i,k} = \Pi_i \cap \Omega_k$. A suitable weight $w_i$ may then be determined as the Hausdorff distance or the maximum Euclidean distance between $C_{i,k}$ and $C_{i,target}$, where $C_{i,target}$ is the contour formed by the target control point for i-th acquisition plane. In other words, more weightage is given to the acquisition plane at which the template mesh deviates more from the target configuration.

In various example embodiments, the mesh morphing stage 410 may be performed in multiple stages, including a first stage (e.g., corresponding to the single-step aggregative-RBF morphing 422 in FIG. 4) and a second stage (e.g., an iterative stage corresponding to real-time source control points computation 426 and aggregative-RBF morphing 428 in FIG. 4). In the first stage, the initial template mesh is morphed to an intermediate configuration that is close to the target shape (target configuration). This can be achieved by performing the aggregative-RBF using Equation (18). For example, the source control points used may be as defined in the template mesh 900 as described hereinbefore with reference to FIGS. 9A to 9C. In addition, for example, $w_i=1$ is used at the first stage. In other words, according to various example embodiments, the intermediate template mesh at the first stage may be configured based on an average over the three long-axis views (respectively corresponding to the three sets of source and target control points). In the second stage, real-time computed source control points are performed (e.g., 426 in FIG. 4), and the aggregative-RBF is performed iteratively (e.g., 428 in FIG. 4). In other words, according to various example embodiments, the intermediate template mesh at each iteration of the second stage may be configured based on a weighted average over the three long-axis views (respectively corresponding to the three sets of source and target control points). This iterative procedure may be summarized as follows, where the subscript i and k denote the axis and iteration, respectively.

i. For each acquisition plane or axis, obtain the contour $C_{i,k} = \Pi_i \cap \Omega_k$. Resample $C_{i,k}$ uniformly so that it has the same number of points as the target control points.

ii. Compute $w_i$, the weight associated with each axis (long-axis view). For example, as described above, the weight may be determined either based on Hausdorff distance or maximum Euclidean distance.

iii. Perform aggregative-RBF morphing 428 based on Equation (18).

iv. Repeat steps (i) to (iii) iteratively until a terminating condition (e.g., 424 in FIG. 4) is reached (e.g., either maximum number of iteration or displacement tolerance).

Mesh Regularization Stage 412

In various example embodiments, to preserve the quality of the mesh during iterative morphing, an optimization-based mesh regularization method is provided to improve the quality of the mesh during each iteration. In this regard, the mesh regularization may be considered as a strain-energy-minimization problem such that the initial state of the mesh is defined by the template configuration. Various example embodiments then seek to minimize the strain energy of the whole mesh after each iteration of aggregative RBF by considering the deformation of each shape/pattern (e.g., triangle) in the template mesh.

Hyperelastic Strain Energy

In various example embodiments, the Mooney-Rivlin Strain Energy Function is employed as the candidate energy function, since the heart is a biological entity and may be best described by a hyperelastic model. The strain energy density function (W) may be expressed as:

$$W = \frac{\mu}{2}(I_1 - 3) - \mu \ln(J) + \frac{\lambda}{2}\ln(J)^2 \quad \text{(Equation 19)}$$

where $\mu$ and $\lambda$ are the Lame's constants, $I_1$ is the first invariants of the right Cauchy-Green deformation tensor C with $C=F^T F$ and F is the deformation gradient, J is determinant of the deformation gradients with J=det(F). The Green-Lagrangian strain tensor is denoted by $E=\frac{1}{2}(F^T F - I)$, where I is the identity matrix.

To compute the second piola-kirchhoff stress tensor (S), the strain energy density (W) is differentiated with respect to the Green-Lagrangian strain tensor (E) as follows:

$$S = \frac{\partial W}{\partial E} = \mu(I - C^{-1}) + \lambda\{\ln(J)\}C^{-1} \quad \text{(Equation 20)}$$

The strain energy for the constant strain triangle (CST), denoted by U, may then be computed by:

$$U = \tfrac{1}{2} t A (E^T S) \quad \text{(Equation 21)}$$

where t is the thickness of the CST (taken to be unity), and A is the area of the CST.

In various example embodiments, the second piola-kirchhoff stress tensor (S) from the strain energy density function (W) is derived using chain rule:

$$S = \frac{\partial W}{\partial E} = \frac{\partial W}{\partial C}\frac{\partial C}{\partial E} = \frac{\partial W}{\partial I}\frac{\partial I}{\partial C}\frac{\partial C}{\partial E} \quad \text{(Equation 22)}$$

In this regard, since $$C = 2E + I, \Rightarrow \frac{\partial C}{\partial E} = 2,$$

the strain energy density function W may be re-written as a function of the invariants of C in the following form:

$$W = \frac{\mu}{2}(I_1 - 3) - \mu \ln(\sqrt{I_3}) + \frac{\lambda}{2}\ln(\sqrt{I_3})^2 \quad \text{(Equation 23)}$$

where $I_3 = \det(C) = J^2$. This implies that:

$$S = 2\frac{\partial W}{\partial I}\frac{\partial I}{\partial C} = 2\frac{\partial W}{\partial I_1}\frac{\partial I_1}{\partial C} + 2\frac{\partial W}{\partial I_3}\frac{\partial I_3}{\partial C} \quad \text{(Equation 24)}$$

and since $$\frac{\partial I_1}{\partial C} = I \text{ and } \frac{\partial I_3}{\partial C} = I_3 C^{-1},$$

therefore:

$$S = 2\left(\frac{\mu}{2}\right)I + 2(I_3 C^{-1})\left(-\mu\frac{1}{\sqrt{I_3}}\frac{1}{2\sqrt{I_3}} + \frac{\lambda}{2}2\ln(\sqrt{I_3})\frac{1}{\sqrt{I_3}}\frac{1}{2\sqrt{I_3}}\right) \quad \text{(Equation 25)}$$

In various example embodiments, the Equation (25) is simplified which will lead to the final form of Equation (19).

Virtual Geometry

Figure 10:
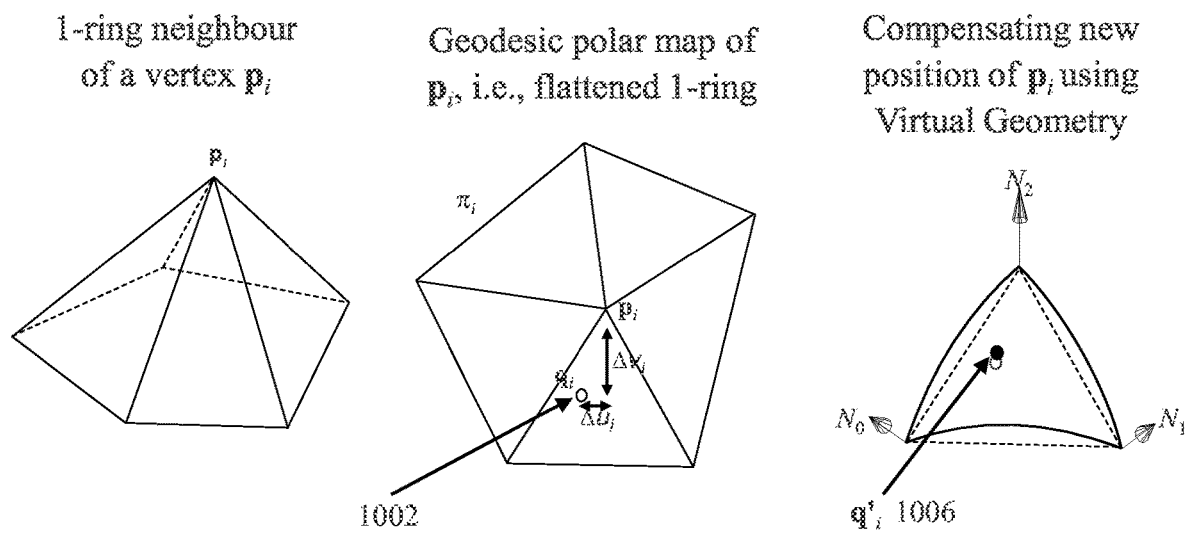
FIG. 10 depicts an example method of mesh regularization according to various example embodiments of the present invention.

In various example embodiments, minimization of the hyperelastic strain energy is achieved through adjusting the location of each vertex of the template mesh, which in turn leads to changes in the geometry of the individual shapes/patterns (e.g., triangles) attached to that vertex, and hence the strain energy. Such an adjustment of the vertex location will create a deviation of the shape of the 3D surface mesh. To preserve the shape of the 3D surface mesh, a post-processing step is applied to the adjusted vertices. In particular, when performing hyperelastic strain energy optimization, adjusting the vertices are adjusted in their own local (x,y) coordinate system, and more specifically, using a polar coordinate system. As a result, the local z-coordinate is essentially ignored. In this regard, various example embodiments of the present invention identified that, when considered in 3D space, the adjustment of the vertices may create a deviation from the actual geometry/shape of the 3D surface mesh (since the local z-coordinate is not considered). To alleviate this issue, various example embodiments use Virtual Geometry to correct against the above-mentioned deviation. Accordingly, in various example embodiments, the mesh regularization is configured to operate in the kernel of a local 2D coordinate system of the vertex. To implement this, according to various example embodiments and with reference to FIG. 10, the 1-ring neighbour of each vertex is converted into a geodesic polar map (also known as 1-ring flattening). The lower and upper bounds for vertex shifting is half the length of the shortest edge attached to the vertex. This has been found to ensure that the deformed position of the vertex $q_i$ 1002 (position of vertex $p_i$ on the geodesic polar map after deformation) will remain within the confines of its original geodesic polar map $\pi_i$, more specifically on the triangle $\tau_i$, as illustrated in FIG. 10.

As $q_i$ 1002 lies in the flat plane of $\tau_i$, various example embodiments compensate its position to represent the underlying curved geometry to achieve better geometrical accuracy, for example, by mapping $\tau_i$ to an associated Virtual Geometry. Given a triangle $\tau_i$ with vertex normals $\{N_0, N_1, N_2\}$, the Virtual Geometry may be defined by a quartic Bézier patch S(u, v, w) such that:

$$S(u, v, w) = \sum_{i+j+k=4} P_{i,j,k} \frac{4!}{i!j!k!} u^i v^j w^k \quad \text{(Equation 26)}$$

where $P_{i,j,k}$'s are the control points of S and (u, v, w) are the Barycentric coordinates associated with $\tau_i$.

Accordingly, in various example embodiments, the barycentric coordinates of $q_i$ 1002 are computed in $\tau_i$, which are then used to compute $q_i'$ 1006 (the compensated position of $q_i$ using Virtual Geometry) in the space of the Virtual Geometry. The value of $q_i'$, 1006 is then used to compute the strain energy of the new configuration. Using the approach/technique described above, a left heart model with surprisingly high mesh quality has been achieved, while incorporating mechanistic consideration into the process, as illustrated in the example geometric reconstruction 1100 of the LA and LV (reconstructed LA-LV mesh models from selected frames (four selected frames) of the full cardiac cycle) shown in FIG. 11.

Storage of Transformation Matrices

After the geometric reconstruction of the LA-LV models over the whole cardiac cycle, in various example embodiments, the transformation matrix that maps the template models to the corresponding cardiac frames can be stored in a memory for subsequent usage, such as in a database 430 as shown in FIG. 4. This advantageously results in significantly less storage requirement as compared to storing each time frame representation of the mesh models. In addition, it allows for flexibility in application. For example, the same transformation matrices may be used for chamber volume computation, regional volume computation, mitral annulus profile analysis, and so on. Therefore, by storing the transformation matrices, it is possible to rapidly derive the patient-specific model needed for a specific use case without incurring huge storage footprint.

Application: LA+LV Volume Computation

Figures 12A, 12B:
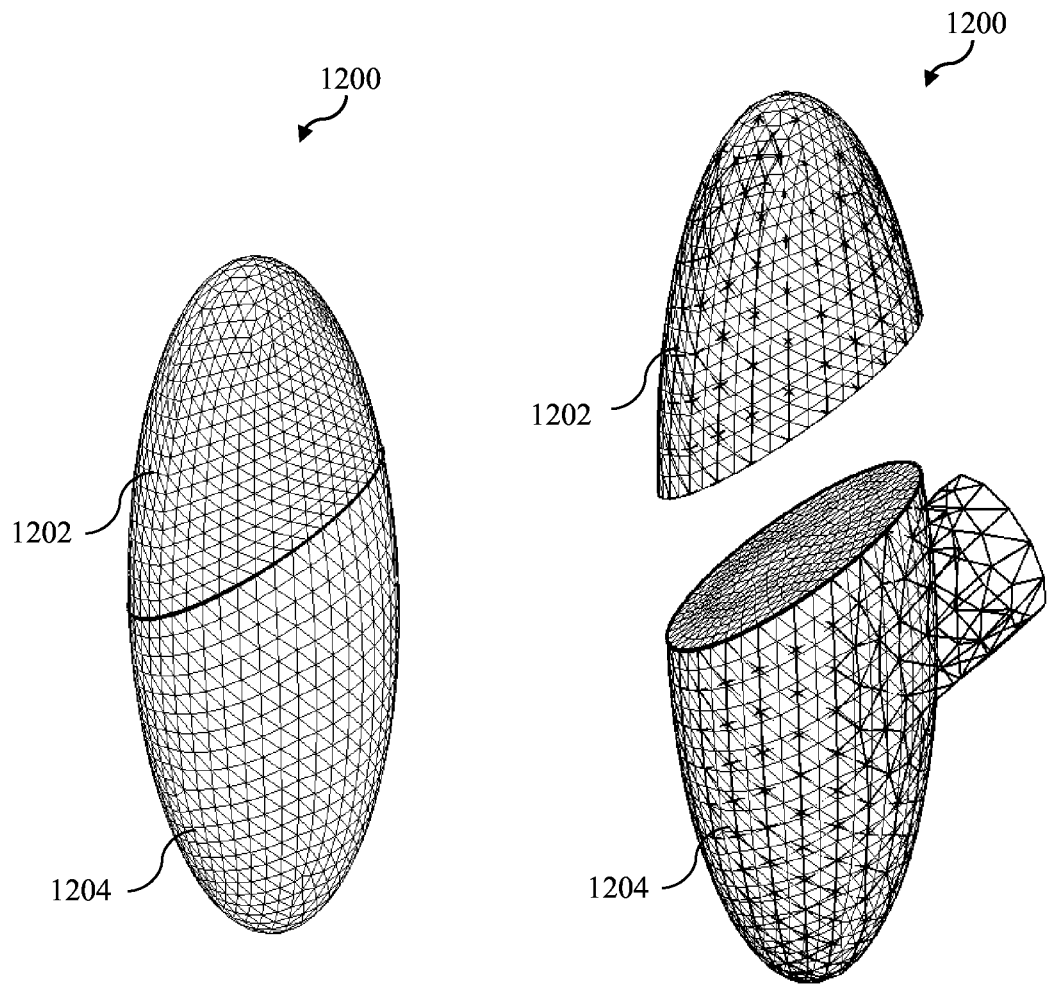
FIGS. 12A and 12B depict an example initial volumetric template mesh for LA and LV according to various example embodiments of the present invention.

To compute the LA and LV volume, in various example embodiments, another set of template meshes may be defined in the same or similar manner (e.g., the control points on the meshes) as the template meshes defined hereinbefore under the sub-heading "Definition of Template Mesh". For example, for ease of reference, such a set of template meshes may be referred to as a set of volumetric meshes, and examples 1200 thereof are illustrated in FIGS. 12A and 12B. In particular, FIG. 12A illustrates example initial volumetric template meshes whereby the LA and LV volumetric meshes 1202, 1204 are represented by closed surface meshes. FIG. 12B illustrates an overlay of the volumetric meshes with its corresponding template meshes used for geometry reconstruction (wireframe).

The control points for the volumetric template meshes 1202, 1204 may be defined in the same or similar manner as that of the geometrical reconstruction template meshes as described hereinbefore. For volume computation, in various example embodiments, the volumetric template meshes are morphed to the corresponding final volumetric template meshes (deformed volumetric template meshes). The source feature points S are the control points on the volumetric template meshes while the target feature points T are the control points on the geometrical reconstructed volumetric template meshes (deformed volumetric template meshes). In various example embodiment, the volumetric mesh morphing may be performed in a single step. Subsequently, the volumes of the LA and LV may be determined as follows:

i. The divergence theorem may be used to reduce the volume integral to a sum of surface integrals over the individual faces of the volumetric mesh (the deformed volumetric template mesh).
ii. The surface integrals may then be further reduced to a sum of line integral using Green's theorem.
iii. The volume may then be computed using the coordinates of the vertices of a face triangle on the closed surface mesh.

For the LA, the volumetric template mesh may be identical to the template mesh described hereinbefore with the exception that it is a closed surface mesh. For the LV, the volumetric template mesh may exclude the aortic outflow region and is also a closed surface mesh. Without wishing to be bound by theory, but the rationales for omitting the contribution of the aortic outflow region for the LV volume computation are twofold: (i) it is difficult to identify the aortic valve plane from the long-axis images because the aortic valve plane does not lie on the same plane as the mitral valve (it is inclined with respect to the mitral valve plane) and (ii) conventional methodology for computing LV volume from short-axis CMR images also neglect the contribution from the aortic outflow region.

Figure 13A:
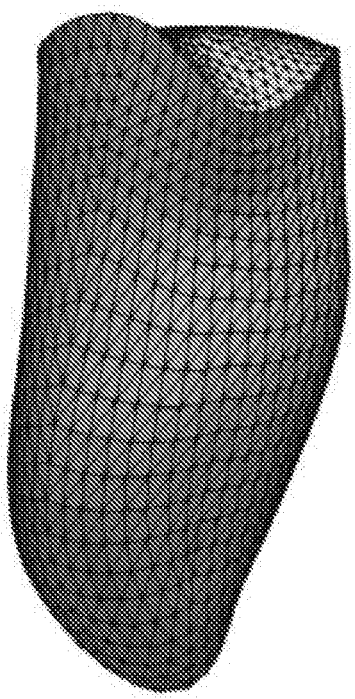
FIGS. 13A and 13B depict deformed volumetric template meshes of the LV and the LA, respectively, according to various example embodiment of the present invention.
Figure 13B:
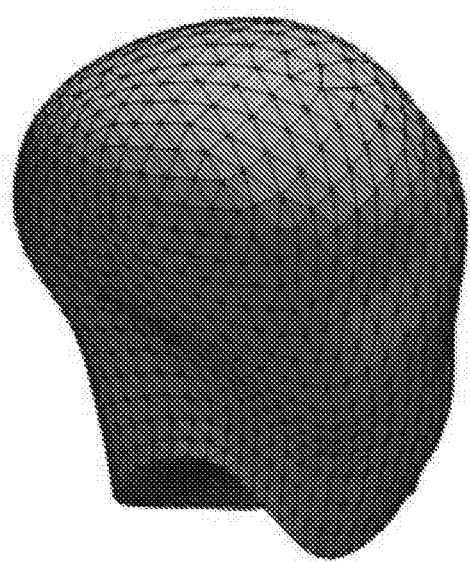
Figure 13C:
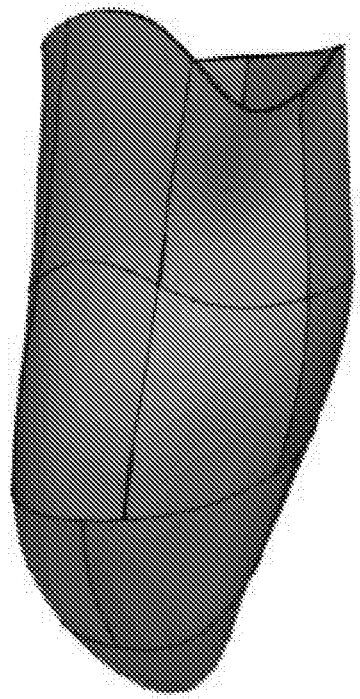
FIG. 13C depicts a regional surface of the deformed volumetric template mesh of the LA according to various example embodiment of the present invention.
Figure 13D:
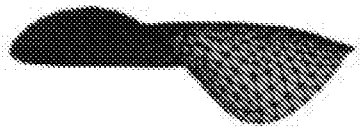
FIG. 13D depicts the mitral annulus surface corresponding to the identified mitral valve plane of the deformed volumetric template mesh according to various example embodiment of the present invention.

It will be appreciated by a person skilled in the art that the method for geometrical construction of an internal anatomical structure can be used in conjunction with various mesh template configurations as appropriate for the intended application. Furthermore, while a water-tight surface mesh template models that describe the LA and LV volumes have been described hereinbefore according to various embodiments, it will be appreciated that it is also possible to configure template models for the sub-volume meshes for regional volume computation, models for mitral valve annulus, finite element mesh models for the myocardium, finite element mesh models for the chamber volume, and so on. For illustration purpose only and without limitation, FIG. 13A depicts a deformed volumetric template mesh of the LV, FIG. 13B depicts a deformed volumetric template mesh of the LA, FIG. 13C depicts a regional surface of the deformed volumetric template mesh of the LA, and FIG. 13D depicts the mitral annulus surface corresponding to the identified mitral valve plane of the deformed volumetric template mesh.

Figure 14A:
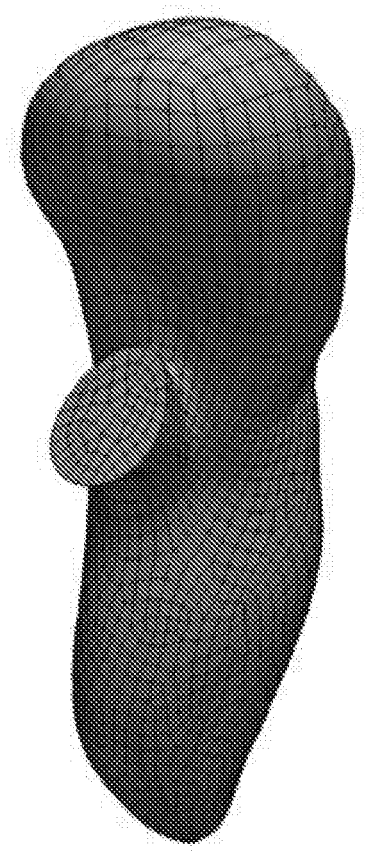
FIG. 14A and FIG. 14B depict a quadrilateral mesh and a hexahedral mesh, respectively, according to various example embodiment of the present invention.
Figure 14B:
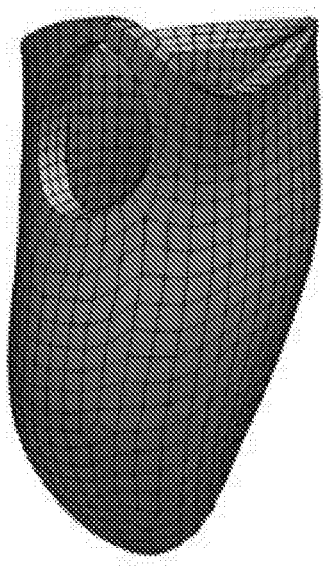

In addition, although the geometry of the individual shapes/patterns (e.g., triangles) of various meshes shown in various figures such as in FIGS. 9A to 9C, FIG. 11 and FIG. 12B are shown to be triangle, it will be appreciated that the individual shapes/patterns are not limited to triangle and various other types of shapes/patterns may be implemented without deviating from the scope of the present invention, such as but not limited to, a quadrilateral mesh as illustrated in FIG. 14A and a hexahedral mesh as illustrated in FIG. 14B.

Experimental Results

Figure 15A:
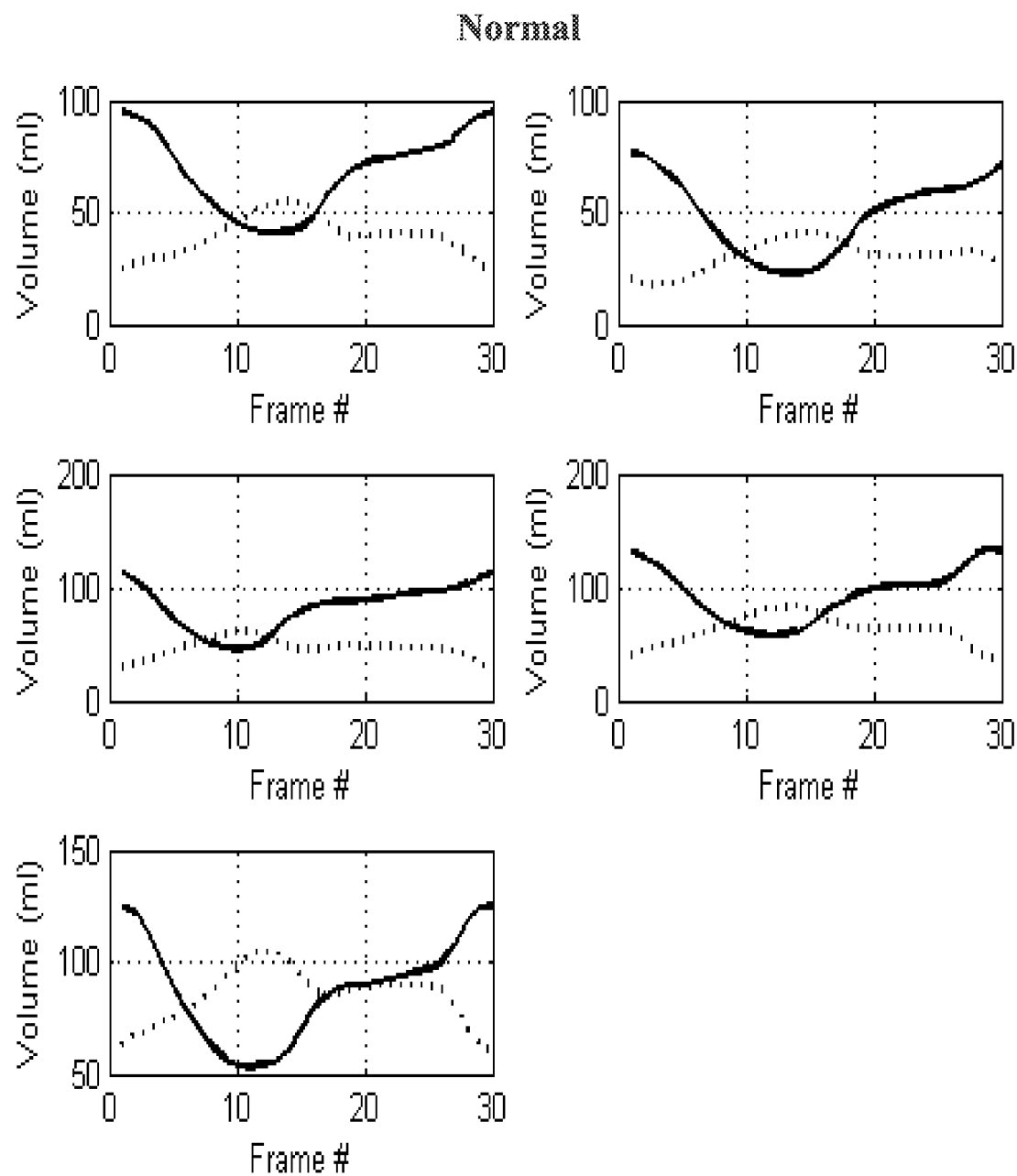
FIGS. 15A to 15C depict time-volume graphs (time against volume graphs) for LA (dotted line) and LV (solid line) for three distinct groups: (i) normal volunteers, (ii) heart failure patients with preserved ejection fraction (HFpEF), and (iii) heart failure patients with reduced ejection fraction (HFrEF), respectively.
Figure 15B:
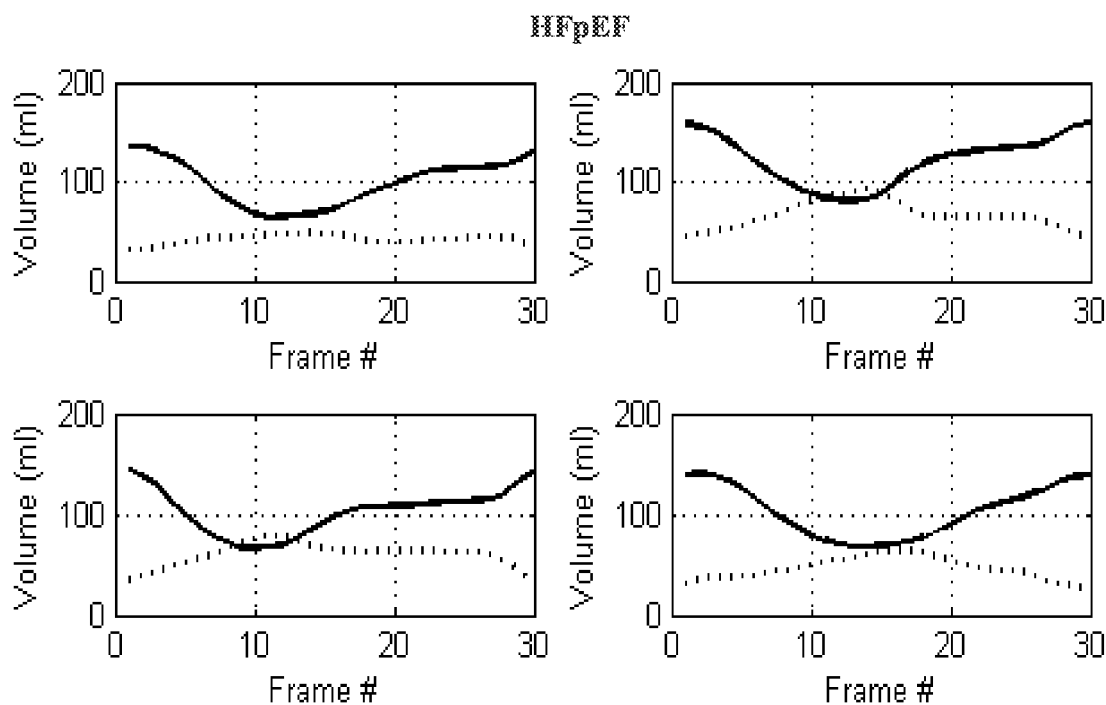
Figure 15C:
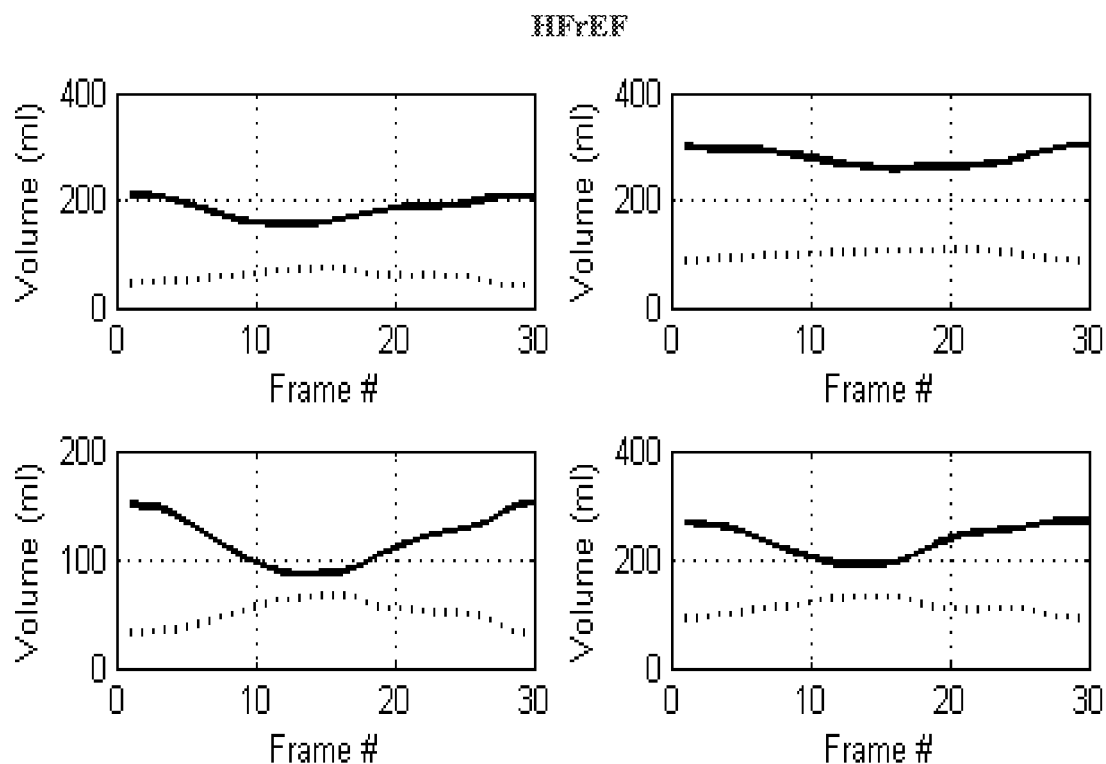
Figure 16A:
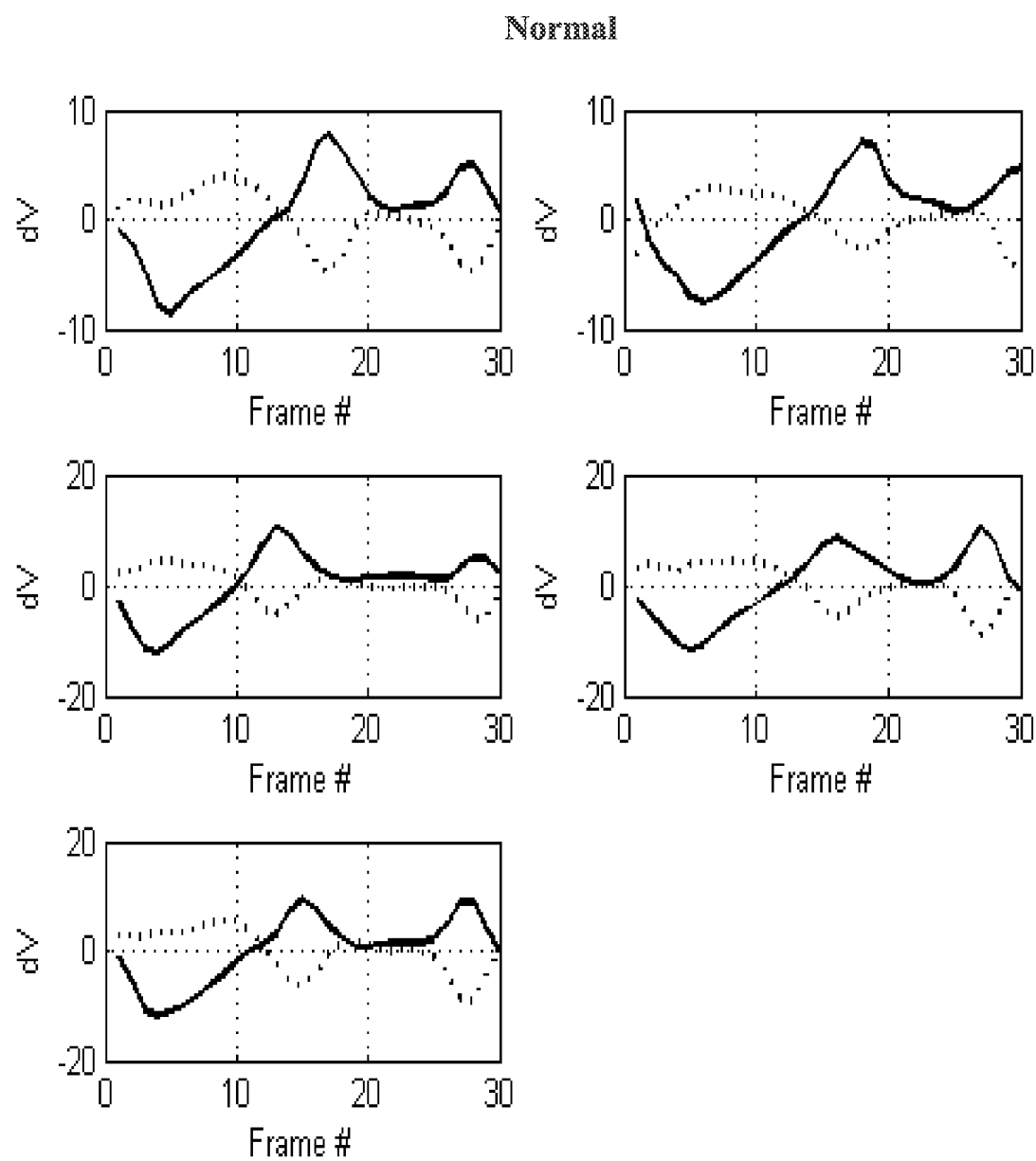
FIGS. 16A to 16C depict time-flow graphs (rate of volume change (dV) against time graphs) for left atrial (dotted line) and left ventricle (solid line) for three distinct groups: (i) normal volunteers, (ii) HFpEF and (iii) HFrEF.
Figure 16B:
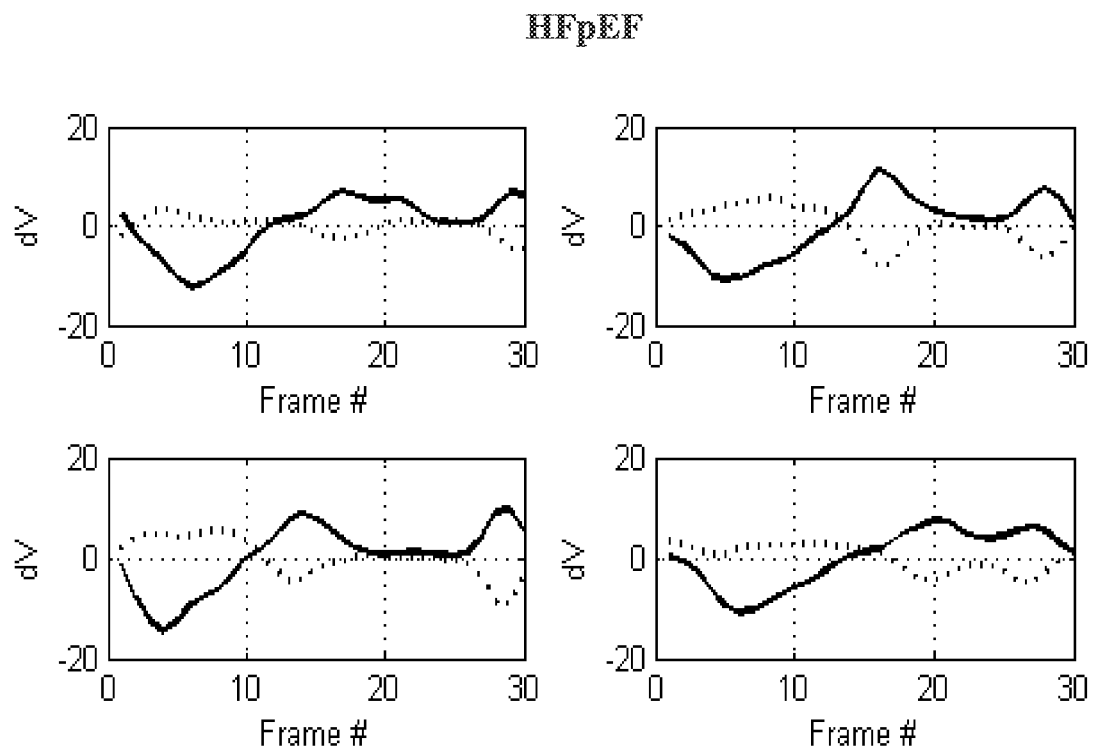
Figure 16C:
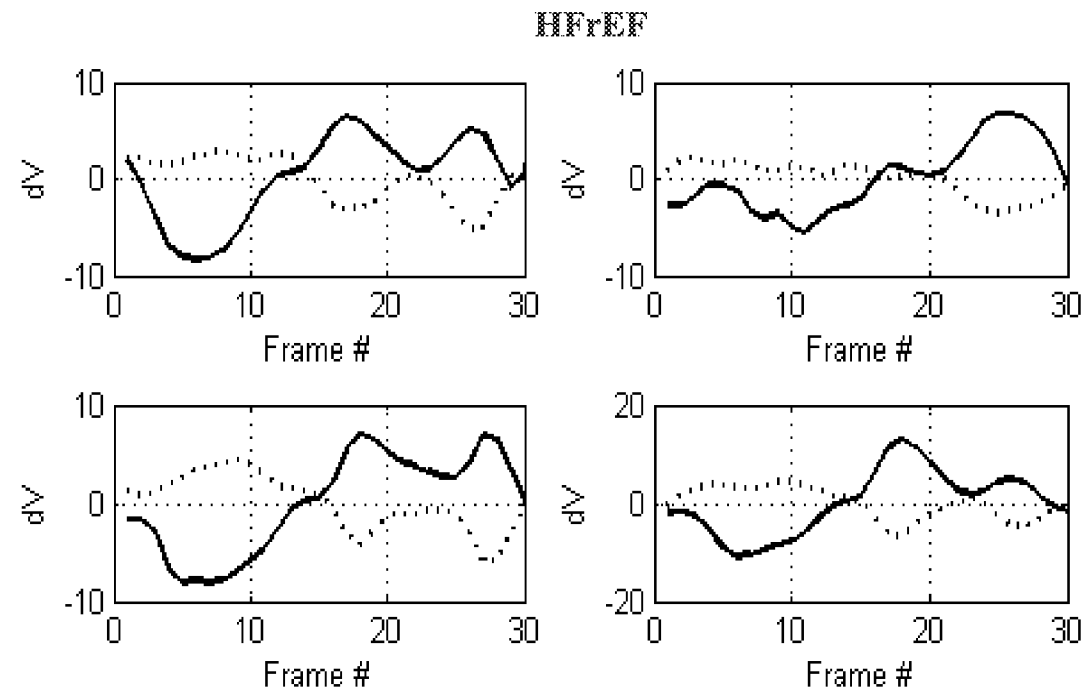

In various experiments conducted using the method for geometrical reconstruction according to various example embodiments of the present invention, FIGS. 15A to 15C depict time-volume curves (time against volume graphs) for LA (dotted line) and LV (solid line) for three distinct groups: (i) normal volunteers (FIG. 15A), (ii) heart failure patients with preserved ejection fraction (HFpEF, FIG. 15B), and (iii) heart failure patients with reduced ejection fraction (HFrEF, FIG. 15C). FIGS. 16A to 16C depict time-flow curves (rate of volume change (dV) against time graphs) for left atrial (dotted line) and left ventricle (solid line) for three distinct groups: (i) normal volunteers (FIG. 16A), (ii) heart failure patients with preserved ejection fraction (HFpEF, FIG. 16B) and (iii) heart failure patients with reduced ejection fraction (HFrEF, FIG. 16C).

Figure 17:
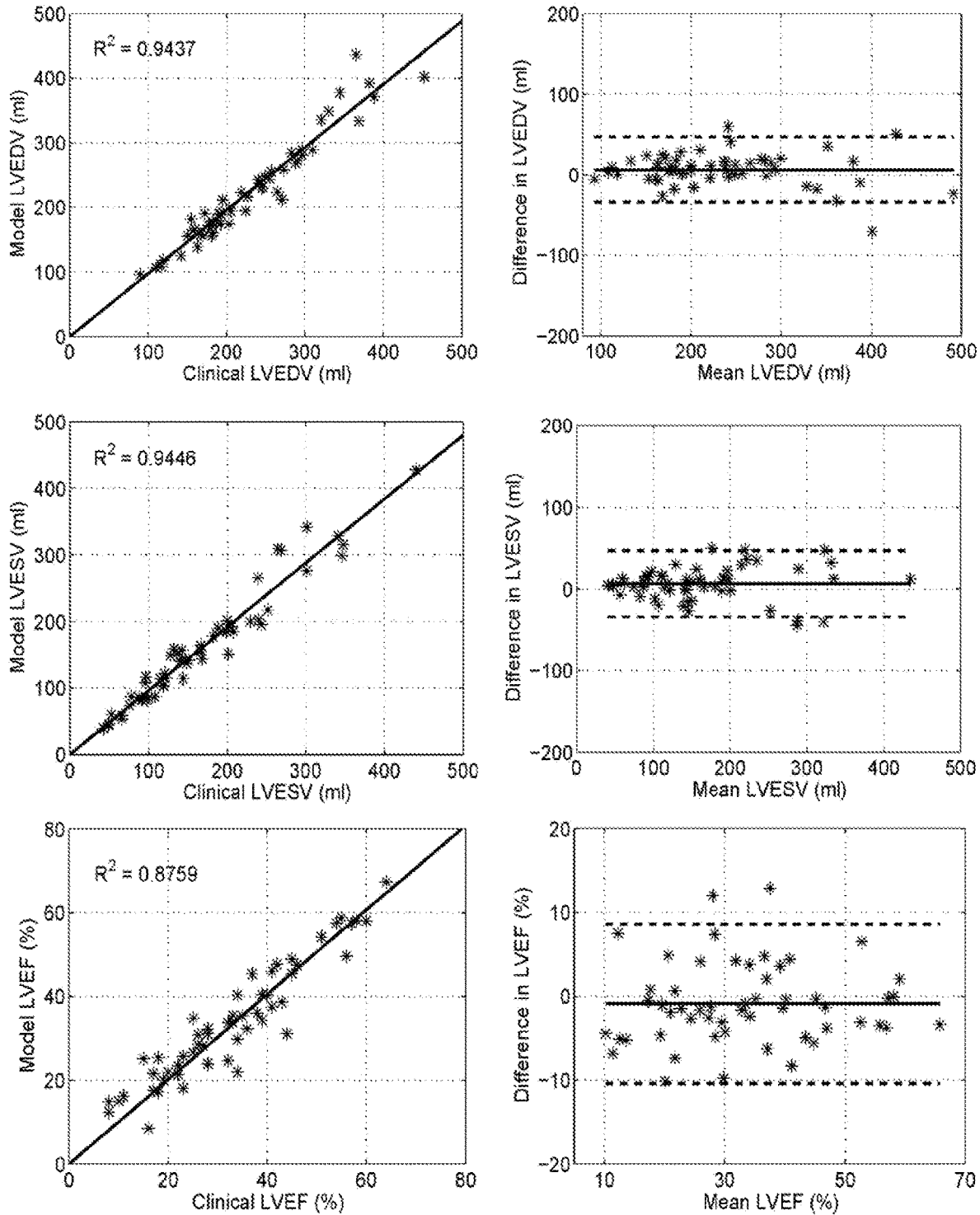
FIG. 17 depicts graphs comparing the LV volumes obtained from the present method according to various example embodiments against the LV volume as reported clinically using the Bland-Altman plots.

Accordingly, by way of an example only and without limitation, the present method for geometrical reconstruction has been demonstrated to be applicable for the computation of both LA and LV volume in healthy normal volunteers and heart failure patients. For example, the viability of the present method has been demonstrated using actual clinical CMR images. Even though, individual LV and LA volume analysis has been performed by many different research groups using various methodologies, the present method is advantageously capable of combining both LV and LA volume analysis in a single workflow using standard clinical CMR images. For example, from FIGS. 15A to 15C and FIGS. 16A to 16C, differences between the contributions of the LA for the Normal, HFrEF and HFpEF in both the volume-time graphs and the time-flow graphs can be observed. For the computation of the LV volume, reproducibility and robustness (e.g., results are independent of noise) has been demonstrated by comparing the LV volumes obtained from the present method according to various example embodiments against the LV volume as reported clinically using the Bland-Altman plots, as shown in the plots in FIG. 17. This comparison demonstrates that there are no biases in the results obtained according to various example embodiments as compared to the clinical results for LV volumes.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for geometrical reconstruction of an internal anatomical structure using at least one processor based on a set of contours derived from the internal anatomical structure, the set of contours comprising a first subset of long-axis contours obtained based on a first set of long-axis images of the internal anatomical structure, the method comprising:
adjusting the set of contours, comprising adjusting the first subset of long-axis contours to correct for motion artefacts in the first set of long-axis images; and
deforming a template three-dimensional (3D) surface mesh preconfigured for the internal anatomical structure's type into a deformed 3D surface mesh based on the adjusted set of contours to obtain the geometrical reconstruction of the internal anatomical structure,
wherein said adjusting the set of contours further comprises:
determining, for each pair of long-axis contours in the first subset of long-axis contours, a first measure associated with the pair of long-axis contours based on a degree of superimposition between the pair of long-axis contours,
wherein said adjusting the first subset of long-axis contours is based on a first function that is dependent on the first measure respectively determined for said each pair of long-axis contours.

2. The method according to claim 1, wherein the set of contours further comprises a second subset of short-axis contours obtained based on a second set of short-axis images of the internal anatomical structure, and said adjusting the set of contours further comprises adjusting the second subset of short-axis contours to correct for motion artefacts in the second set of short-axis images.

3. The method according to claim 2, wherein said adjusting the set of contours further comprises:
determining, for each pair of long-axis contour in the first subset of long-axis contours and short-axis contour in the second subset of short-axis contours, a second measure associated with the pair of long-axis contour and short-axis contour based on a degree of superimposition between the pair of long-axis contour and short-axis contour;
wherein said adjusting the first subset of long-axis contours and said adjusting the second subset of short-axis contours are based on the first function that is further dependent on the second measure respectively determined for said each pair of long-axis contour and short-axis contour.

4. The method according to claim 3, wherein said adjusting the first subset of long-axis contours comprises translating one or more of the long-axis contours in the first subset of long-axis contours and said adjusting the second subset of short-axis contours comprises translating one or more of the short-axis contours in the second subset of short-axis contours, based on a minimization of the first function.

5. The method according to claim 4, wherein:
the first set of long-axis images and the second set of short-axis images of the internal anatomical structure are obtained over one or more cycles associated with the internal anatomical structure, each cycle comprising a plurality of phases,
said determining the first measure and said determining the second measure are performed for each of the plurality of phases, and
the minimization of the first function is performed over the cycle associated with the internal anatomical structure.

6. The method according to claim 1, wherein said deforming the template 3D surface mesh comprises:
mapping, for each of a plurality of long-axis contours of the adjusted set of contours, source control points on the template 3D surface mesh with respect to corresponding target control points on the long-axis contours, respectively.

7. The method according to claim 6, wherein said deforming the template 3D surface mesh further comprises determining a weight parameter for each of the plurality of long-axis contours, respectively; and
said mapping is performed based on a mapping function that is dependent on the weight parameter respectively determined for said each of the plurality of long-axis contours.

8. The method according to claim 7, wherein the weight parameter is determined based on a distance between the long-axis contour of the plurality of long-axis contours and a corresponding long-axis contour of the template 3D surface mesh.

9. The method according to claim 8, wherein said deforming the template 3D surface mesh comprises deforming the template 3D surface mesh iteratively, wherein for each iteration, said mapping is performed based on the mapping function that is dependent on the weight parameter respectively determined for said each of the plurality of long-axis contours, the weight parameter being determined based on said corresponding long-axis contour of the template 3D surface mesh deformed at the immediately preceding iteration.

10. A system for geometrical reconstruction of an internal anatomical structure based on a set of contours derived from the internal anatomical structure, the set of contours comprising a first subset of long-axis contours obtained based on a first set of long-axis images of the internal anatomical structure, the system comprising:
a memory; and
at least one processor communicatively coupled to the memory and configured to:
adjust the set of contours, comprising adjusting the first subset of long-axis contours to correct for motion artefacts in the first set of long-axis images; and
deform a template three-dimensional (3D) surface mesh preconfigured for the internal anatomical structure's type into a deformed 3D surface mesh based on the adjusted set of contours to obtain the geometrical reconstruction of the internal anatomical structure,
wherein said adjust the set of contours further comprises:
determining, for each pair of long-axis contours in the first subset of long-axis contours, a first measure associated with the pair of long-axis contours based on a degree of superimposition between the pair of long-axis contours,
wherein said adjusting the first subset of long-axis contours is based on a first function that is dependent on the first measure respectively determined for said each pair of long-axis contours.

11. The system according to claim 10, wherein the set of contours further comprises a second subset of short-axis contours obtained based on a second set of short-axis images of the internal anatomical structure, and said adjust the set of contours further comprises adjusting the second subset of short-axis contours to correct for motion artefacts in the second set of short-axis images.

12. The system according to claim 11, wherein said adjust the set of contours further comprises:
determining, for each pair of long-axis contour in the first subset of long-axis contours and short-axis contour in the second subset of short-axis contours, a second measure associated with the pair of long-axis contour and short-axis contour based on a degree of superimposition between the pair of long-axis contour and short-axis contour;
wherein said adjusting the first subset of long-axis contours and said adjusting the second subset of short-axis contours are based on the first function that is further dependent on the second measure respectively determined for said each pair of long-axis contour and short-axis contour.

13. The system according to claim 12, wherein said adjusting the first subset of long-axis contours comprises translating one or more of the long-axis contours in the first subset of long-axis contours and said adjusting the second subset of short-axis contours comprises translating one or more of the short-axis contours in the second subset of short-axis contours, based on a minimization of the first function.

14. The system according to claim 13, wherein:
the first set of long-axis images and the second set of short-axis images of the internal anatomical structure are obtained over one or more cycles associated with the internal anatomical structure, each cycle comprising a plurality of phases,
said determining the first measure and said determining the second measure are performed for each of the plurality of phases, and
the minimization of the first function is performed over the cycle associated with the internal anatomical structure.

15. The system according to claim 10, wherein said deform the template 3D surface mesh comprises:

mapping, for each of a plurality of long-axis contours of the adjusted set of contours, source control points on the template 3D surface mesh with respect to corresponding target control points on the long-axis contours, respectively.

16. The system according to claim 15, wherein said deforming the template 3D surface mesh further comprises determining a weight parameter for each of the plurality of long-axis contours, respectively; and
said mapping is performed based on a mapping function that is dependent on the weight parameter respectively determined for said each of the plurality of long-axis contours.

17. The system according to claim 16, wherein:
the weight parameter is determined based on a distance between the long-axis contour of the plurality of long-axis contours and a corresponding long-axis contour of the template 3D surface mesh, and
said deform the template 3D surface mesh comprises deforming the template 3D surface mesh iteratively, wherein for each iteration, said mapping is performed based on the mapping function that is dependent on the weight parameter respectively determined for said each of the plurality of long-axis contours, the weight parameter being determined based on said corresponding long-axis contour of the template 3D surface mesh deformed at the immediately preceding iteration.

18. A computer program product, embodied in one or more non-transitory computer-readable storage mediums, comprising instructions executable by at least one processor to perform a method for geometrical reconstruction of an internal anatomical structure based on a set of contours derived from the internal anatomical structure, the set of contours comprising a first subset of long-axis contours obtained based on a first set of long-axis images of the internal anatomical structure, the method comprising:
adjusting the set of contours, comprising adjusting the first subset of long-axis contours to correct for motion artefacts in the first set of long-axis images; and
deforming a template three-dimensional (3D) surface mesh preconfigured for the internal anatomical structure's type into a deformed 3D surface mesh based on the adjusted set of contours to obtain the geometrical reconstruction of the internal anatomical structure,
wherein said adjusting the set of contours further comprises:
determining, for each pair of long-axis contours in the first subset of long-axis contours, a first measure associated with the pair of long-axis contours based on a degree of superimposition between the pair of long-axis contours,
wherein said adjusting the first subset of long-axis contours is based on a first function that is dependent on the first measure respectively determined for said each pair of long-axis contours.

* * * * *